United States Patent
Raffle

(10) Patent No.: US 9,507,426 B2
(45) Date of Patent: Nov. 29, 2016

(54) USING THE Z-AXIS IN USER INTERFACES FOR HEAD MOUNTABLE DISPLAYS

(71) Applicant: Google Inc., Mountain View, CA (US)

(72) Inventor: Hayes Solos Raffle, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 286 days.

(21) Appl. No.: 13/851,529

(22) Filed: Mar. 27, 2013

(65) Prior Publication Data

US 2016/0048211 A1    Feb. 18, 2016

(51) Int. Cl.
*G06F 3/01*    (2006.01)

(52) U.S. Cl.
CPC ................... *G06F 3/017* (2013.01)

(58) Field of Classification Search
None
See application file for complete search history.

(56) References Cited

U.S. PATENT DOCUMENTS

| | | |
|---|---|---|
| 5,579,026 A | 11/1996 | Tabata |
| 5,844,547 A | 12/1998 | Minakuchi et al. |
| 6,184,847 B1 | 2/2001 | Fateh et al. |
| 7,088,343 B2 * | 8/2006 | Smith et al. ................. 345/173 |
| 7,176,888 B2 | 2/2007 | Marvit et al. |
| 2009/0303176 A1 * | 12/2009 | Chen et al. ................... 345/156 |
| 2010/0328351 A1 * | 12/2010 | Tan ................................ 345/661 |
| 2012/0016641 A1 * | 1/2012 | Raffa et al. ....................... 703/2 |
| 2012/0218177 A1 | 8/2012 | Pang et al. |
| 2013/0293490 A1 * | 11/2013 | Ward et al. ................... 345/173 |
| 2014/0063055 A1 * | 3/2014 | Osterhout et al. ............ 345/633 |
| 2014/0361988 A1 * | 12/2014 | Katz et al. .................... 345/156 |

FOREIGN PATENT DOCUMENTS

EP    2156652 B1    4/2012

* cited by examiner

*Primary Examiner* — Ryan Barrett
*Assistant Examiner* — Mahelet Shiberou
(74) *Attorney, Agent, or Firm* — McDonnell Boehnen Hulbert & Berghoff LLP

(57) ABSTRACT

Methods, apparatus, and computer-readable media are described herein related to a user interface (UI) for a computing device, such as a head-mountable device (HMD). The computing device can detect a communication event. In response to the communication event, the computing device can display a first item having a current size on a display associated with a display plane. A hand-movement input device associated with the computing device can receive a first input indicative of a gesture toward the display plane. In response to receiving the first input, the computing device can display a first change to the current size of the first item. The hand-movement input device can receive a second input indicative of a gesture away from the display plane. In response to the second input, the computing device can display a second change to the current size of the first item.

17 Claims, 17 Drawing Sheets

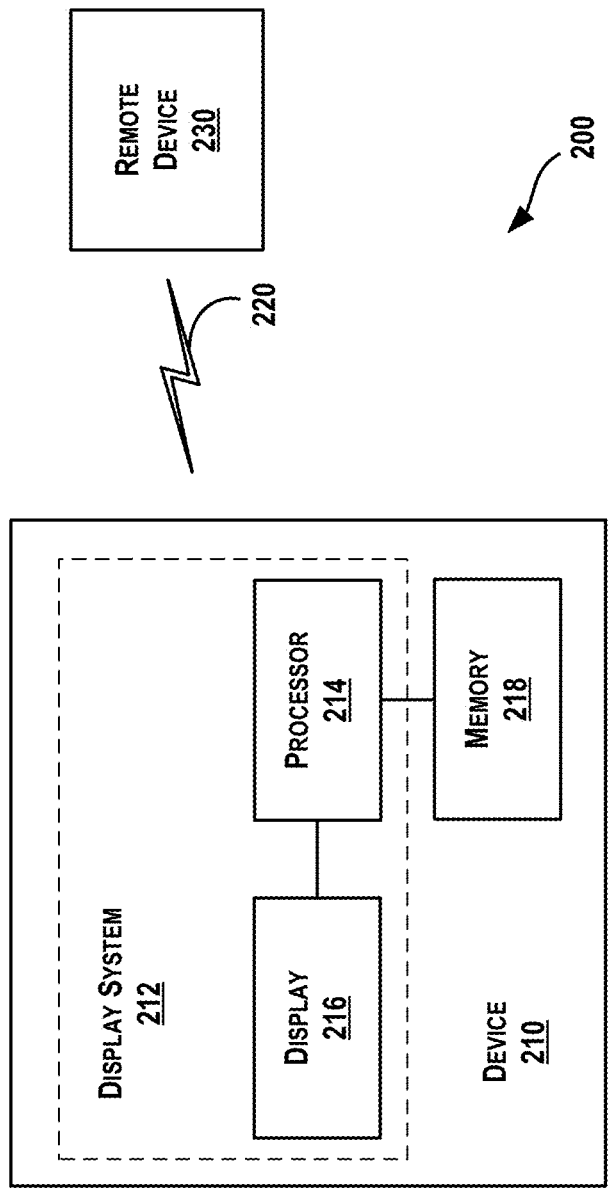

Multi-Tiered User Model 400

Basic

Tap = Select
Swipe forward/away = Choose next
Swipe backward/toward = Choose previous
Swipe down = Back/Home/Sleep Voice = Access voice menu
Camera button press = Take a photo

Intermediate

Tap = Select
Swipe forward/away = Choose next
Swipe backward/toward = Choose previous
Swipe down = Back/Home/Sleep Voice = Access voice menu
Camera button press = Take a photo
Camera button long press = Capture menu Two finger swipe forward/away = Z-axis move away
Two finger swipe backward/toward = Z-axis move toward
Two finger swipe down = Sleep

Advanced

Tap = Select
Swipe forward/away = Choose next
Swipe backward/toward = Choose previous
Swipe down = Back/Home/Sleep Voice = Access to voice menu
Camera button press = Take a photo
Camera button long press = Capture menu Two finger swipe forward/away = Z-axis move away
Two finger swipe backward/toward = Z-axis move toward
Two finger swipe down = Sleep Two finger press and hold = The clutch Nudge = HMD wake / sleep

FIG. 4

USING THE Z-AXIS IN USER INTERFACES FOR HEAD MOUNTABLE DISPLAYS

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy part or all of a wearer's field of view. Further, head-mounted displays may be as small as a pair of glasses or as large as a helmet.

SUMMARY

In one aspect, a method is provided. A computing device detects a communication event. In response to detecting the communication event, the computing device: displays a first item on a display associated with the computing device, where the first item has a current size, and where the display is associated with a display plane; receives a first input at a hand-movement input device associated with the computing device, where the first input is indicative of a gesture toward the display plane; in response to receiving the first input, displays a first change to the current size of the first item; receives a second input at the hand-movement input device, where the second input is indicative of a gesture away from the display plane; and in response to receiving the second input, displays a second change to the current size of the first item.

In another aspect, a computing device is provided. The computing device includes a processor, and a non-transitory computer-readable storage medium having stored thereon program instructions. The program instructions, upon execution by the processor, cause the computing device to perform functions including: detecting a communication event; and in response to detecting the communication event, the computing device: displaying a first item on a display associated with the computing device, where the first item has a current size, and where the display is associated with a display plane; receiving a first input at a hand-movement input device associated with the computing device, where the first input is indicative of a gesture toward the display plane; in response to receiving the first input, displaying a first change to the current size of the first item; receiving a second input at the hand-movement input device, where the second input is indicative of a gesture away from the display plane; and in response to receiving the second input, displaying a second change to the current size of the first item.

In yet another aspect, an apparatus is provided. The apparatus includes a non-transitory computer-readable storage medium having stored thereon program instructions. The program instructions, upon execution by a computing device, cause the apparatus to perform functions. The functions include: detecting a communication event; and in response to detecting the communication event: displaying a first item on a display associated with the apparatus, where the first item has a current size, and where the display is associated with a display plane; receiving a first input at a hand-movement input device associated with the apparatus, where the first input is indicative of a gesture toward the display plane; in response to receiving the first input, displaying a first change to the current size of the first item; receiving a second input at the hand-movement input device, where the second input is indicative of a gesture away from the display plane; and in response to receiving the second input, displaying a second change to the current size of the first item.

In another aspect, a device is provided. The device comprises: means for detecting a communication event; and means for, in response to detecting the communication event: displaying a first item using means for displaying, where the first item has a current size, and where the means for displaying is associated with a display plane; means for receiving a first input at means for hand-movement input, where the first input is indicative of a gesture toward the display plane; means for, in response to receiving the first input, displaying a first change to the current size of the first item; means for receiving a second input at the means for hand-movement input, where the second input is indicative of a gesture away from the display plane; and means for, in response to receiving the second input, displaying a second change to the current size of the first item.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 2A illustrates a schematic drawing of a computing device according to an example embodiment.

FIG. 4 shows example operations of a multi-tiered user model for a UI for a HMD, according to an example embodiment.

DETAILED DESCRIPTION

Figure 1A:
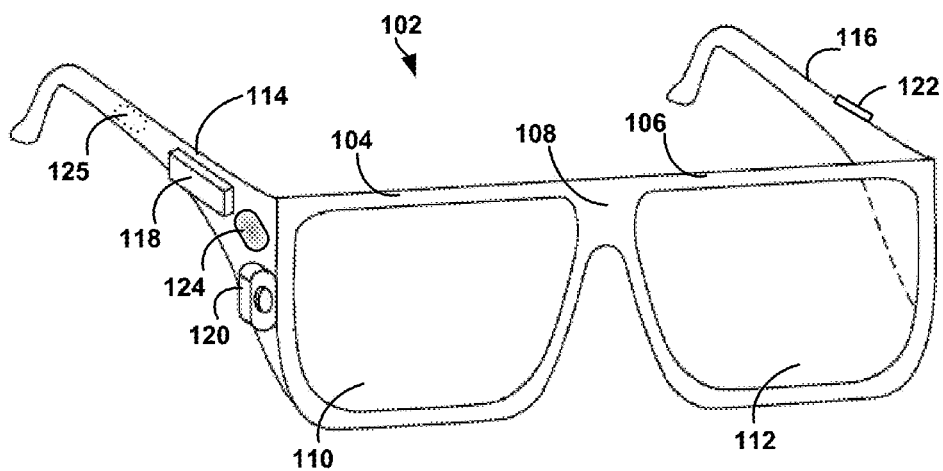
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

A. OVERVIEW

Many example graphical user interfaces (GUIs) provide information and/or allow for user interaction in two dimensions. The two dimensions can be identified as the X dimension and the Y dimension, where the X dimension is for horizontal or left-right movement, and Y dimension is for vertical or up-down movement.

For example, a GUI for an HMD may include a two-dimensional timeline feature that allows the wearer to navigate through a sequence of ordered screens arranged along an X-axis representing time. In the context of such a timeline feature, each screen may be referred to as a "card." Among the sequence of cards, one or more cards can be displayed, and of the displayed card(s), one card can be "focused on" for possible selection. For example, the timeline can be present one card for display at a time, and the card being displayed is also the card being focused on. In one embodiment, when a card is selected, the card can be displayed using a single-card view that occupies substantially all of the viewing area of the display.

Each card may be associated with a certain application, object, or operation. The cards can be ordered by a time associated with the card, application, object or operation represented by the card. For example, if a card shows a photo captured by a wearer of the HMD at 2:57 PM, the time associated with the card is the time associate with the underlying photo object of 2:57 PM. Upon power up, the HMD can display a "home card", also referred to as a home screen. The home card can display a clock, and be associated with a time of "now" or a current time. In some cases, the home card can display a clock, to reinforce the association between the home card and now. Then, cards associated with times before now can be viewed in the timeline as prior to the home card, and cards associated with times equal to or after now can be viewed in the timeline subsequent to the home card.

While using the timeline feature of the HMD, incoming "push" messages trying to deliver information to a wearer of the HMD, such as a telephone call, can demand the wearer's immediate attention. User interfaces for push messages and other applications can fail provide an intuitive and direct means for interaction; e.g., accepting or rejecting messages.

In some embodiments, use of a third or Z dimension for depth, can make GUIs more intuitive and easier to use. For example, a UI action associated with "moving toward" a wearer of an HMD can be associated with "increasing" a parameter/value or "bringing closer"/"answering" a message. Similarly, a UI action associated with "move away" a wearer of an HMD can be associated with "decreasing" a parameter/value or "pushing away"/"rejecting" a message. To simulate Z axis operations, increasing the size of an object in an XY display can simulate bringing the object closer, while decreasing the size of an object in the XY display can simulate moving away from the object.

Use of Z-axis oriented displays (ZAODs) can aid device setup. For example, settings software can set up a ZAOD for setting output sound volume for an HMD. The wearer of the HMD can use the ZAOD adjust the output sound volume. For example, the wearer can perform a movement associated with bringing closer to increase the output sound volume/size of an image associated with volume (e.g., an icon of a loudspeaker). Also, the wearer can perform a movement associated with pushing away to decrease the output sound volume/size of an image associated with volume. Other examples are possible as well.

Another use of the third dimension can also permit increasing or decreasing size of a two dimensional display. For example, by default, the timeline can present one card for display at a time, and the card being displayed is also the card being focused on. In one embodiment, when a card is selected, the card can be displayed using a single-card view that occupies substantially all of the viewing area of the display.

Using the third dimension with the timeline feature can permit zooming out, or decreasing the size of, and zooming in, or increasing the size of the timeline feature. As the wearer zooms in on one card, the one card can be thought to be brought closer to the wearer and occupy most or all of the wearer's display of the timeline. In some embodiments, the wearer can zoom in on a single card display obtain additional information about the single card being displayed. For example, if the single card shows a contact, zooming in on or bringing the contact card closer can show additional information, such as e-mail address, telephone number, job title, and physical address information for the contact. As another example, bringing a card of a photo or video closer can lead to displaying additional information, such as time, date, size, and perhaps location information associated with the photo or video. Zooming away from, or pushing the single card away can lead to clearing the display of the additional information, and, if pushed away far enough, lead to a multi-card display of the timeline feature.

Z-axis oriented displays can allow for different imagery and/or additional information to be displayed and controlled using natural combinations of finger and head movements. These Z-axis oriented displays can provide wearers of HMDs with efficient and easy messaging, device settings, and timeline navigation, and so enable more efficiently and effective HMD use.

B. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touchpad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touchpad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors.

For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touchpad 124 is shown on the extending side-arm 114 of the HMD 102. However, the finger-operable touchpad 124 may be positioned on other parts of the HMD 102. Also, more than one finger-operable touchpad may be present on the HMD 102. The finger-operable touchpad 124 may be used by a user to input commands. The finger-operable touchpad 124 may sense at least one of a pressure, position and/or a movement of one or more fingers via capacitive sensing, resistance sensing, or a surface acoustic wave process, among other possibilities. The finger-operable touchpad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touchpad surface. In some embodiments, the finger-operable touchpad 124 may be formed of one or more translucent or transparent insulating layers and one or more translucent or transparent conducting layers. Edges of the finger-operable touchpad 124 may be formed to have a raised, indented, or roughened surface, so as to provide tactile feedback to a user when the user's finger reaches the edge, or other area, of the finger-operable touchpad 124. If more than one finger-operable touchpad is present, each finger-operable touchpad may be operated independently, and may provide a different function.

In some embodiments, hand or finger based inputs that can be received via touchpad 124 can be received using one or more hand-movement input devices configured to detect hand movements and/or finger movements and provide corresponding hand-movement data, such as but not limited to, buttons, touch screens, computer mice, gesture sensors, free space/3D gesture sensors, virtual reality gloves, other types of gloves, cameras, optical gesture sensors, non-contact electrostatic gesture sensors, a magnetometer detecting a moving magnetic field controlled by a wearer; e.g., a ring having a magnetic field being worn and moved by the wearer, and infrared sensors/sensor arrays.

In a further aspect, HMD 102 may be configured to receive user input in various ways, in addition or in the alternative to user input received via finger-operable touchpad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
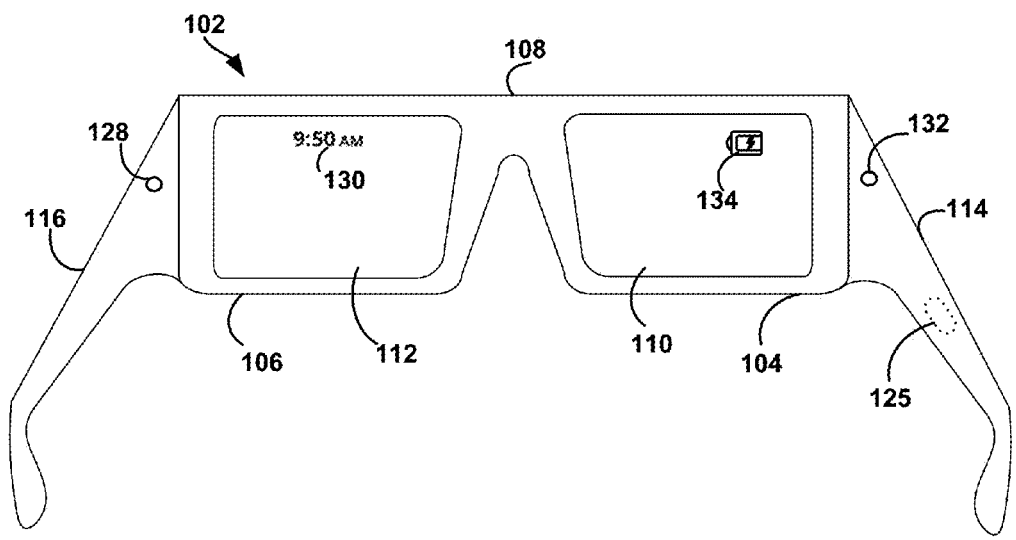
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
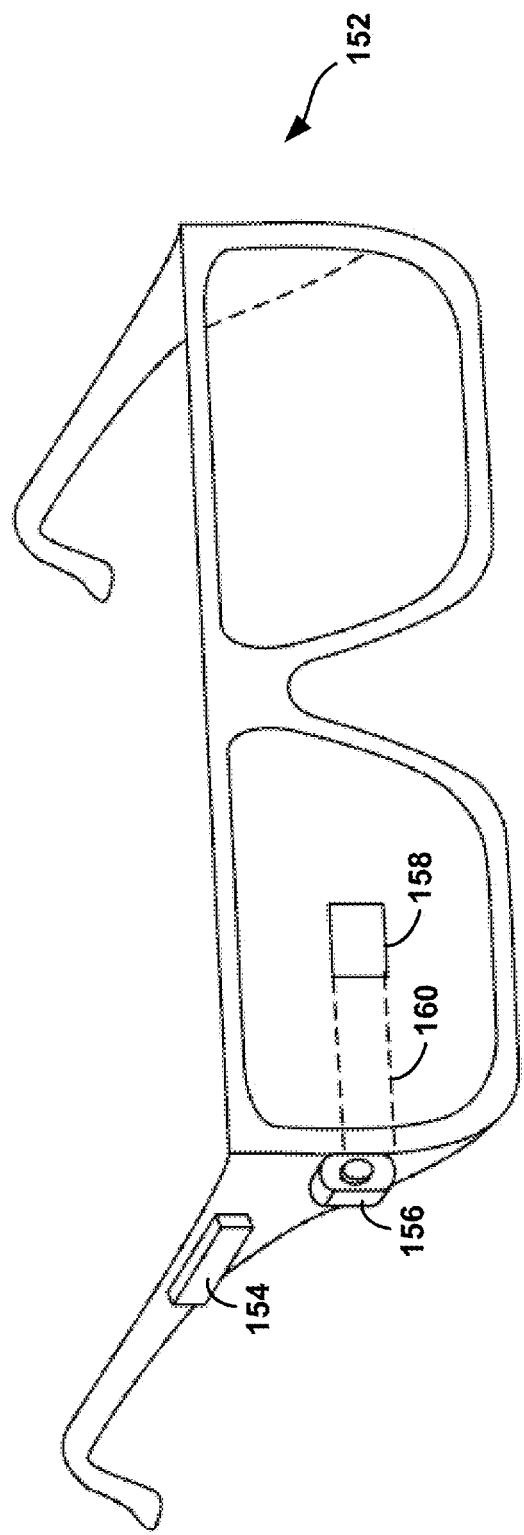
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
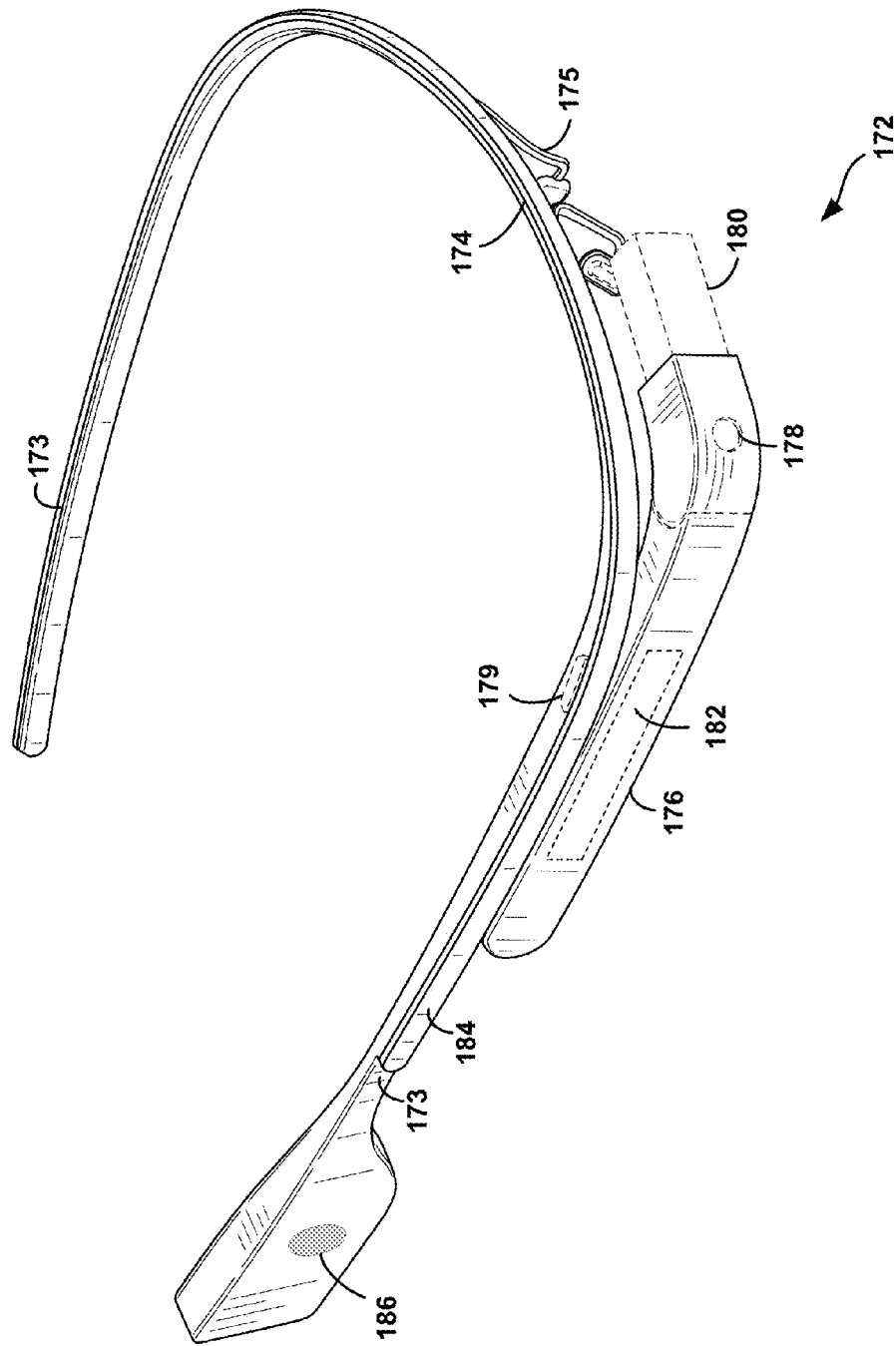
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
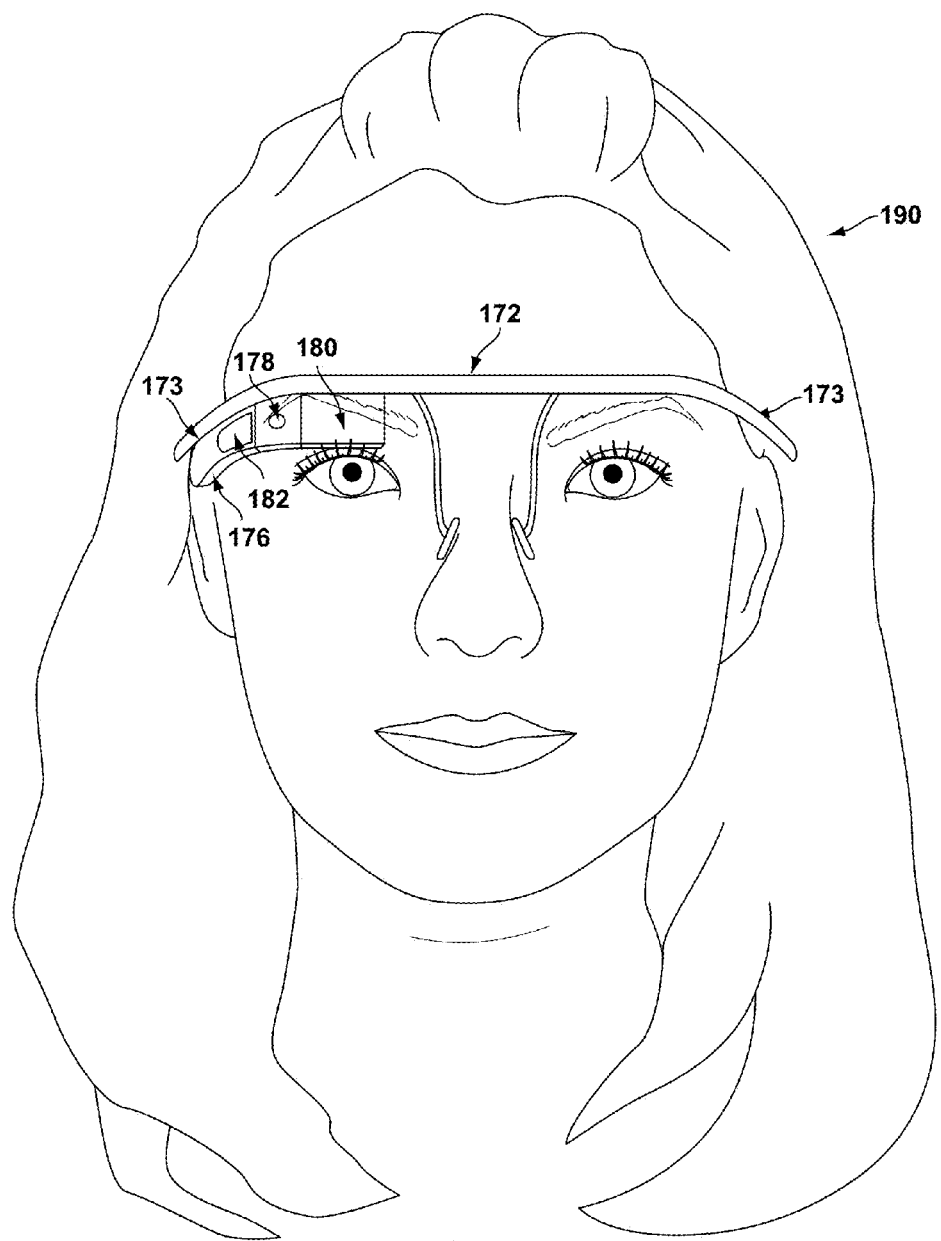
FIGS. 1E to 1G are simplified illustrations of the wearable computing system shown in FIG. 1D, being worn by a wearer.
Figure 1F:
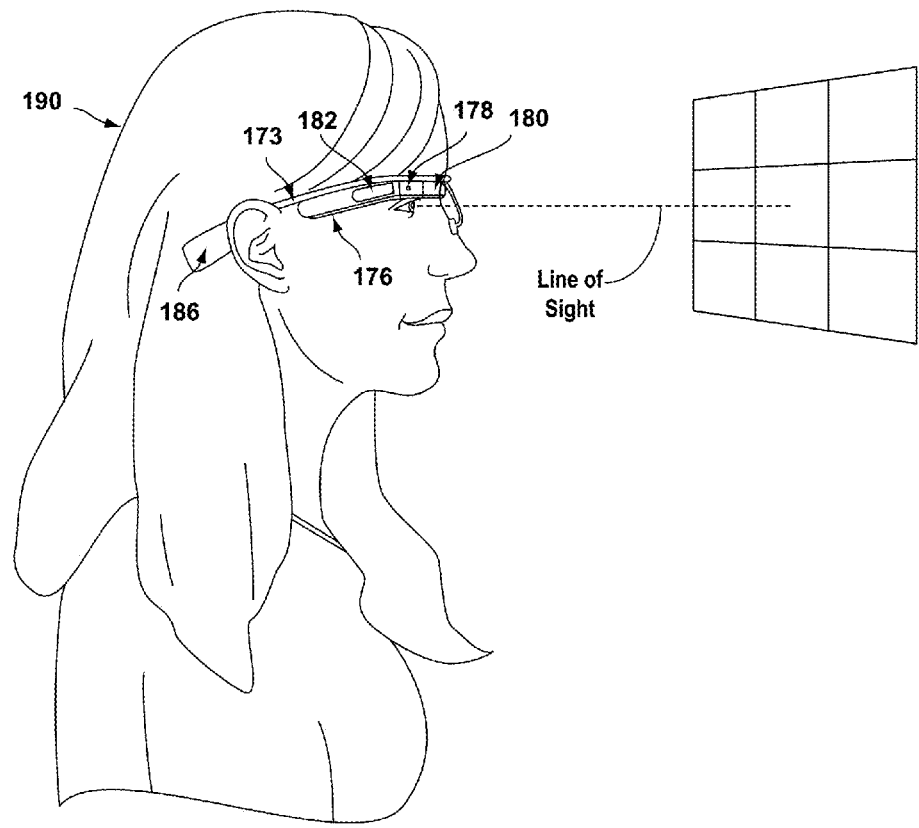
Figure 1G:
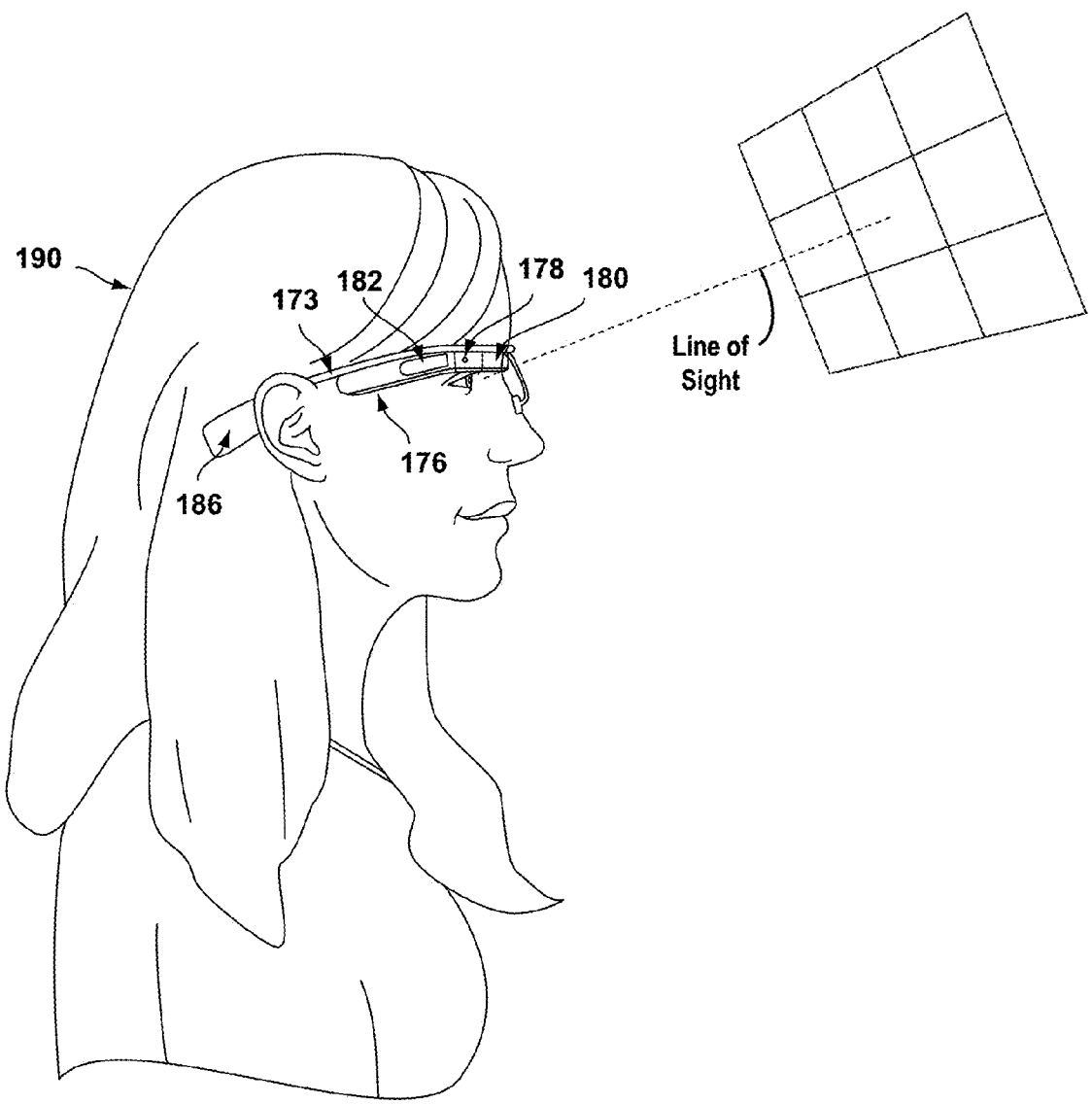

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

FIG. 2A illustrates a schematic drawing of a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.)

C. EXAMPLE COORDINATE SYSTEMS

Figure 2B:
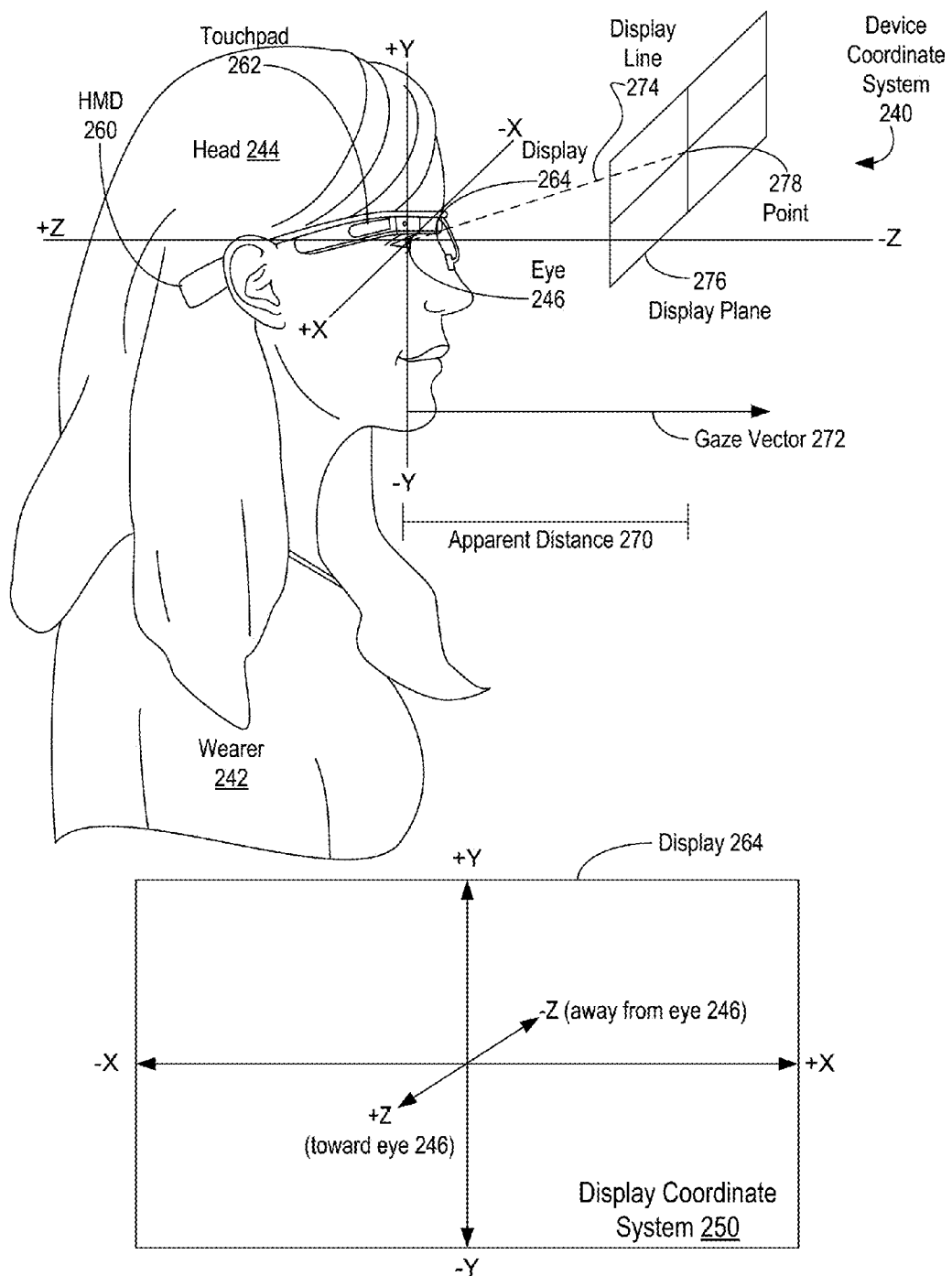
FIG. 2B shows an example device coordinate system and an example display coordinate system according to an example embodiment.

FIG. 2B shows an example device coordinate system 240 and corresponding display coordinate system 250 in accordance with an embodiment. The device coordinate system 250 is used herein: when WCD 260 is level and upright on head 244 of wearer 242 with display 264 facing eye 246 of wearer 242, as shown in FIG. 2B, +X is right, +Y is up, and +Z is towards eye 246 (with respect to display 264) such that forward is −Z. In Figures showing the YZ plane, +X is toward the reader and −X is away from the reader in device coordinates. In terms of device coordinates, a swipe toward (sometimes termed swipe backward or swipe left) can involve a swipe, or movement by one or more fingers touching the touchpad, in the +Z direction. In device coordinates, a swipe away (sometimes termed swipe forward or swipe right) can involve swiping in the −Z direction.

Device coordinate system 240 can be used to specify a coordinate system for images shown in eye 246 of wearer 242 using display 264. FIG. 2B shows display coordinate system 250 for displaying images using display 264 as viewed by wearer 242. As shown in FIG. 2B, when WCD 260 is level and upright on head 244 with display 264 facing eye 246, +X in device coordinate system 250 is right along display 264, +Y in device coordinate system 250 is up with respect to display 264, and +Z in display coordinate system 250 is towards eye 246. For example, for fixed X and Y components in display coordinate system 250 objects shown on display 264 with a Z component of Z1 can appear to be larger to wearer 242 than objects having a Z component of Z2, where Z1>Z2. That is, as Z coordinates increase in display coordinate system 260, image displayed in display 264 using display coordinate system 250 appear increasingly larger up to the limits of display 264. In some embodiments, a two-dimensional display system can use coordinates of display coordinate system with a fixed Z component; e.g., Z=0. Unless specifically stated otherwise, X, Y, and Z components are specified below using display coordinate system 250.

HMD 260 can project an image in display plane 276 for view by wearer 242 at some apparent distance 270 along display line 274. For example, apparent distance 270 can be 1 meter, four feet, infinity, or some other distance. Display line 274 can be based on gaze vector 272. Gaze vector 272 tracks wearer 254's gaze, or direction of viewing. In FIG. 2B, wearer 242 is looking directly in the −Z direction, and thus gaze vector 272 is a vector along the −Z axis. For the sake of viewability, FIG. 2B shows gaze vector 272 below eye 246.

In an example shown in FIG. 2B, display line 274 can be directed to be above and to the right of gaze vector 272. Then, an image can be projected at display plane 276 that is perpendicular to display line 274 and includes at least point 278 where display line 274 is at apparent distance 270 from wearer 242. The image can be displayed in display plane 276 projected above and to the right of gaze vector 272; e.g., the image can be displayed as centered at point 278. Then, wearer 242 can look at a person or object along gaze vector 272 without the displayed image obscuring their gaze. In one example, the display element of the HMD 260 is translucent when not active (i.e. when an image is not being displayed), and so the wearer 242 can perceive objects in the real world along a vector corresponding to display line 274.

FIG. 2B shows that touchpad 262 is parallel, or at least substantially parallel, to display line 274, and thus is perpendicular, or at least substantially perpendicular to display plane 276. As such, touchpad 262 is at least substantially perpendicular to an image displayed in display plane 276. In some scenarios, touchpad 262 can be perpendicular to display plane 276 and so be perpendicular to an image displayed by display 264 in display plane 276. In other scenarios, touchpad 262 can be substantially, but not exactly, perpendicular to display plane 276 depending on a shape of a face of wearer 242, an exact angle that wearer 242 wears HMD 260 at any specific time, a specific configuration of HMD 260, and for other reasons that would cause touchpad 262 to vary from being perpendicular to an image displayed by display 264 in display plane 276. In very particular embodiments, touchpad 262 is substantially perpendicular to an image displayed by display 264 if a line from touchpad 262 to a plane of the image, e.g., display plane 276 is within 10 degrees of being perpendicular to the plane of the image.

D. AN EXAMPLE USER INTERFACE FOR AN HMD

FIGS. 3 through 8 collectively describe aspects of an example user interface for an HMD such as discussed above at least in the context of FIGS. 1A through 2B. The HMD can be configured with a UI controller receiving inputs from at least a touch-based UI. The touch-based UI can include one or more hand-movement input devices that are configured to receive various hand movements, such as one-finger swipes in various directions, two-finger or multi-finger swipes in various directions, taps, button presses of various durations, and button releases, and generate corresponding hand-movement data. In some embodiments, the one or more hand-movement input devices can be one or more of the hand-movement input devices discussed above in the context of FIG. 1A. In particular embodiments, the one or more hand-movement input devices can include a touchpad, such as touchpad 124, and a button. In some embodiments, the HMD can utilize a voice-based UI as well.

Once a touch is received, the touch-based UI can report the touch; e.g., a "swipe forward" or "tap" to the HMD, or in some cases, to a component of the HMD such as a UI controller. In other embodiments, the HMD can act as the UI controller. As described herein, the HMD includes any necessary components, such as but not limited to one or more UI controllers, which are configured to perform and control the UI operations described herein.

Figure 3:
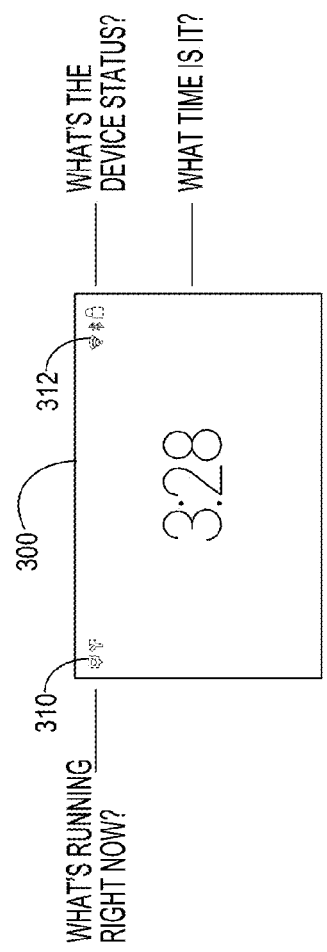
FIG. 3 shows an example home card of an example UI for a HMD, according to an example embodiment.

The HMD can generate cards that can occupy the full display of the HMD when selected. One card is a home card that is the first card displayed when UI is activated, for example shortly after HMD powers up or when the HMD wakes from a sleep or power-saving mode. FIG. 3 shows an example home card 300 of an example user interface, according to an example embodiment. Home card 300 includes application status indicators 310, device status indicators 312, hint 316 and a clock shown in large numerals indicating the current time in the center of home card 300. Application status indicators 310 can indicate which application(s) are operating on the HMD. As shown in FIG. 3, application status indicators 310 include camera and Y-shaped road icons to respectively indicate operation of a camera application and a navigation application. Such indicators can remind the wearer what applications or processes are presently running and/or consuming power and/or processor resources of the HMD.

Device status indicators 312 can indicate which device(s) are operating on the HMD and HMD status. As shown in FIG. 3, device status indicators 312 include icons for a wireless network and a Bluetooth network, respectively, that indicate the HMD is presently configured for communication via a wireless network and/or a Bluetooth network. In one embodiment, the HMD may not present device status indicators 312 on home card 300.

The UI can accept as inputs certain UI operations performed using the touch-based UI. The UI can receive these UI operations and responsively perform actions to enable the wearer to interact with the HMD. These UI operations can be organized into tiers. FIG. 4 lists example UI operations in multi-tiered user model 400 for the HMD, according to an example embodiment.

As shown in FIG. 4, multi-tiered user model 400 has three tiers: basic, intermediate, and advanced. The basic tier provides the smallest number of UI operations of any tier of multi-tiered user model 400. The intermediate tier includes all UI operations provided by the basic tier, along with additional operations not provided by the basic tier. Similarly, the advanced tier includes all UI operations provided by the basic and intermediate tiers, along with additional operations not provided by either the basic tier or intermediate tier.

FIG. 4 shows that the basic tier of multi-tiered user model 400 provides tap, swipe forward, swipe backward, voice, and camera button press operations. A tap operation can involve a single physical tap—that is, one quick, slight strike with one or more fingers on a touchpad of the touch-based UI. A swipe forward operation, sometimes termed a swipe away or a swipe right, can involve a swipe in the general −Z direction; e.g., the direction from the wearer's ear toward the wearer's eye when the wearer has the HMD on. A swipe backward operation, sometimes termed a swipe left or swipe toward, can involve in the general +Z direction; e.g., the direction from the wearer's eye toward the wearer's ear when the wearer has the HMD on. A swipe down operation can involve a downward swipe, where downward is the general direction from the top of the wearer's head toward the wearer's neck when the wearer has the HMD on; e.g., the −Y direction in device coordinate system 250.

While example embodiments in this description make reference to particular directions of touchpad input such as up, down, left, right, it should be understood that these are exemplary and that embodiments where certain operations may be triggered via different input directions are contemplated.

In one embodiment, the physical actions used by the wearer to perform some or all of the herein-described operations can be customized; e.g., by the wearer and/or other entity associated with the HMD. For example, suppose the wearer prefers to perform a physical action of a double-tap—that is, one physical tap quickly followed by a second physical tap—rather than the above-mentioned single physical tap, to perform a tap operation. In this embodiment, the wearer and/or other entity could configure the HMD to recognize a double-tap as a tap operation, such as by training or setting the HMD to associate the double-tap with the tap operation. As another example, suppose that the wearer would like to interchange the physical operations to perform swipe forward and backward operations; e.g., the swipe away operation would be performed using a physical action described above as a swipe left and the swipe toward operation would be performed using a physical action described above as a swipe right. In this embodiment, the wearer could configure the HMD to recognize a physical swipe left as a swipe away operation and physical swipe right as a swipe toward operation. Other customizations are possible as well; e.g., using a sequence of swipes to carry out the tap operation.

The tap operation can select a currently visible card. The swipe away operation can remove the currently visible card from display and select a next card for display. The swipe toward operation can remove the currently visible card from display and select a previous card for display. In other contexts, such as in the context of a Z-axis oriented display, a swipe toward and a swipe away can have different effects, such as, respectively zooming in or zooming out on an image or timeline, increasing or decreasing a settings value, or respectively causing a message to be answered or rejected.

The swipe down operation can, depending on context, act to go back, go home, or sleep. Going back can remove the currently visible card from display and display a previously-visible card for display. For example, the previously-visible card can be the card that was most recently prior currently visible card; e.g. if card A is currently visible and card B is the recently prior currently visible card, then the swipe down operation can remove card A from visibility and display card B. Going home can replace the currently visible card from display and display the home card. Sleeping can cause part; e.g., the display, or all of the HMD to be deactivated.

In some embodiments, a voice operation can provide access to a voice menu of operations. In other embodiments, a camera button press can instruct the HMD to take a photo using a camera associated with and/or part of the HMD.

FIG. 4 shows that the intermediate tier of multi-tiered user model 400 provides tap, swipe forward, swipe backward, voice, and camera button press operations as described above in the context of the basic tier. Also, the intermediate tier provides camera button long press, two finger swipe forward, two finger swipe backward, and two finger swipe down operations.

The camera button long press operation can instruct the HMD to provide a capture menu for display and use. The capture menu can provide one or more operations for using the camera associated with HMD.

In some embodiments, Z-axis oriented movement within an HMD display can be performed by a wearer can swipe toward, swipe away, swipe up, using two fingers on the touchpad of the HMD. For example, a two-finger swipe forward (swipe away) can be interpreted as moving away or decreasing a Z-axis coordinate, and a two-finger swipe backward (swipe toward) can be interpreted as moving toward or increasing the Z-axis coordinate. In some scenarios, a two-finger swipe backward can be used to zoom in on one or more cards and a two-finger swipe forward can be used to zoom out from one or more cards.

The two finger swipe down can cause the HMD to sleep. In some embodiments, the two finger swipe down can save the current position in the timeline for recall and redisplay upon awakening the HMD.

FIG. 4 shows that the advanced tier of multi-tiered user model 400 provides tap, swipe forward, swipe backward, voice, and camera button press operations as described above in the context of the basic tier, as well as camera button long press, two finger swipe forward, two finger swipe backward, and two finger swipe down operations described above in the context of the intermediate tier. The advanced tier also provides one-finger press-and-hold, two-finger press-and-hold, and nudge operations.

The two-finger press-and-hold can provide a "clutch" operation, which can be performed by pressing on the touch-based UI in two separate spots using two fingers and holding the fingers in their respective positions on the touch-based UI. After the fingers are held in position on the touch-based UI, the clutch operation is engaged. In some embodiments, the HMD recognizes the clutch operation only after the fingers are held for at least a threshold period of time; e.g., one second. The clutch operation will stay engaged as long as the two fingers remain on the touch based UI.

The nudge operation can be performed using a short, slight nod of the wearer's head. For example, the HMD can be configured with accelerometers or other motion detectors that can detect the nudge and provide an indication of the nudge to the HMD. Upon receiving indication of a nudge, the HMD can toggle an activation state of the HMD. That is, if the HMD is active (e.g., displaying a card on the activated display) before the nudge, the HMD can deactivate itself (e.g., turn off the display) in response. Alternatively, if the HMD is inactive before the nudge but is active enough to detect nudges; e.g., within two or a few seconds of notification of message arrival, the HMD can activate itself in response.

By way of further example, in one scenario, the HMD is powered on with the display inactive. In response to the HMD receiving a new text message, an audible chime can be emitted by the HMD. Then, if the wearer nudges within a few seconds of the chime, the HMD can activate and present a card or a Z-axis oriented display with the content of the text message. If, from the activated state, if the user nudges again, the display will deactivate. Thus, in this example, the user can interact with the device in a completely hands-free manner.

Figure 5A:
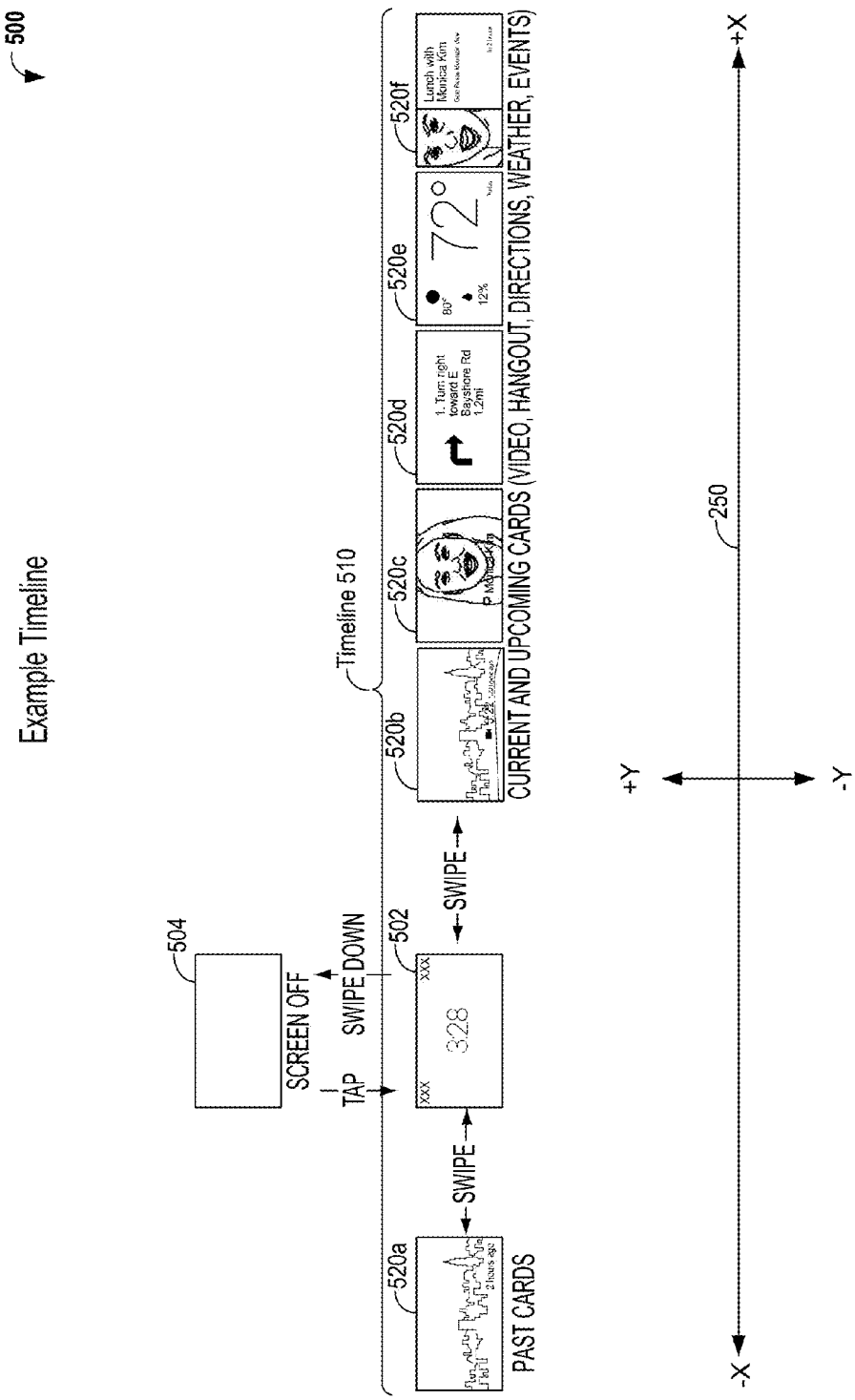
FIG. 5A shows a scenario of example timeline interactions, according to an example embodiment.

As mentioned above, the UI maintains a timeline or ordered sequence of cards that can be operated on using the operations described in FIG. 4 immediately above. FIG. 5A shows a scenario 500 of example timeline interactions, according to an example embodiment.

Scenario 500 begins with home card 502 being displayed by an HMD worn by a wearer. Home card 502 and cards 520a-520c can be arranged as a "timeline" or ordered sequence of cards. FIG. 5A shows that cards 520a-520c are arranged along the X-axis of device coordinate system 250. In the example shown in FIG. 5A, each card in timeline 510 has a specific time associated with the card.

Timeline 510 can be ordered along the X-axis based on the specific time associated with each card. In some cases, the specific time can be "now" or the current time. For example, home card 502 can be associated with the specific time of now. In other cases, the time can be a time associated with an event leading to the card. For example, FIG. 5A shows that card 520a represents a photo taken at a time 2 hours ago. Then, card 520a can be associated with the specific time of 1:28, which is 2 hours before the current time of 3:28 shown on home card 502. As the specific time of card 520a is less than now, the time associated with home card 502, card 520a is shown having a smaller X component in device coordinate system 250 than home card 502.

Cards 520b-520f represent current cards, or cards associated with the specific time of now, or upcoming cards, or cards associated with a future time. For example, card 520b is a current card that includes an image currently generated by a camera associated with the HMD, card 520c is a current card that includes an image of a "hangout" or video conference call currently in-progress generated by an application of the HMD, card 520d is a current card that includes an image and text currently generated by a navigation application/process presently running on the HMD, card 520e is a current card that includes images and text currently generated by a weather application of the HMD, and 520f is an upcoming card that includes images and text generated by a calendar application of the HMD indicating an appointment for "Lunch with Monica Kim" in "2 hours".

In some embodiments, home card 502 can be the left-most card along timeline 510 associated with the time of now; i.e., home card 502 can have the smallest X component for all cards associated with the time of now. Then, cards 520b-520f, each of which are associated with a time of now or a later time, can have a larger X component in device coordinate system 250 than home card 502.

In scenario 500, the HMD can enable navigation of time line 520 using swipe operations. For example, starting at home card 502, a swipe backward operation can cause the HMD to select and display a previous card, such as card 520a, and a swipe forward operation the HMD to select and display a next card, such as card 520b. Upon displaying card 520b, the swipe forward operation can cause the HMD to select and display the previous card, which is home card 502, and the swipe backward operation can cause the HMD to select and display the next card, which is card 520c.

In scenario 500, there are no cards in timeline 510 that are previous to card 520a. In one embodiment, the timeline is represented as circular. For example, in response to a swipe backward operation on card 520a requesting a previous card for display, the HMD can select 520f for (re)display, as there are no cards in timeline 510 that are after card 520f during scenario 500. Similarly, in response to a swipe forward operation on card 520f requesting a next card for display, the HMD can select 520a for (re)display, as there are no cards in timeline 510 that are after card 520f during scenario 500.

In another embodiment, instead of a circular representation of the timeline, when the user navigates to the end of the timeline, a notification is generated to indicate to the user that there are no additional cards to navigate to in the instructed direction. Examples of such notifications could include any of or a combination of any of a visual effect, an audible effect, a glowing effect on the edge of the card, a three dimensional animation twisting the edge of the card, a sound (e.g. a click), a textual or audible message indicating that the end of the timeline has been reached (e.g. "there are no cards older than this"). Alternatively, in one embodiment, an attempt by the user to navigate past a card in a direction where there are no additional cards could result in no effect, i.e. swiping right on card 520a results in no perceptible change to the display or card 520a.

Figure 5B:
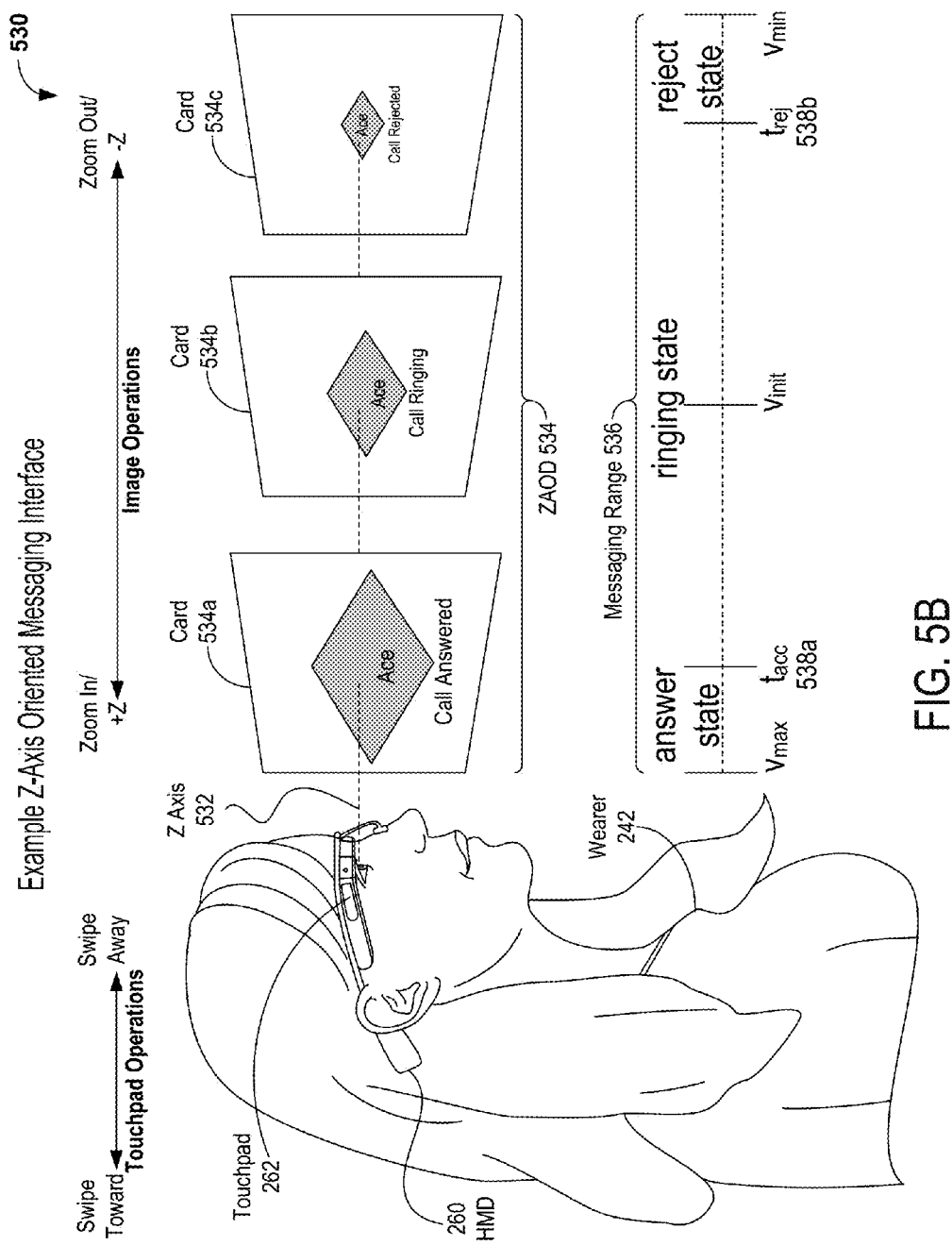
FIG. 5B shows an example scenario using a Z-axis oriented messaging interface, according to an example embodiment.

FIG. 5B shows scenario 530 using an example Z-axis oriented messaging interface, according to an example embodiment. Scenario 530 begins with wearer 242 wearing HMD 260 and receiving an incoming telephone call from a contact named "Ace". HMD 260 can then generate Z-Axis Oriented Display (ZAOD) 534 to permit wearer 242 to interact with the incoming call via graphical operations along Z axis 532. To simulate Z axis operations, increasing the size of an object in ZAOD 534 can simulate bringing the object closer (in the Z dimension), while decreasing the size of an object in ZAOD 534 can simulate moving away from the object (in the Z dimension).

In some embodiments, upon receiving indication of the telephone call, HMD 260 can use a "messaging value" to reflect wearer 242's desire to answer the call and/or indicate a call state. FIG. 5B shows messaging range 536 between a minimum value $v_{min}$ and a maximum value $v_{max}$.

In scenario 530, the messaging value is initialized to a value of $v_{init}$ between $v_{min}$ and $v_{max}$ to indicate an initial desire to answer the call of "maybe" and/or a call state of "ringing". If the messaging value increases to acceptance threshold $t_{acc}$ 538a or above, the messaging value can indicate a desire to answer the call of "yes" and/or a call state of "answer". Once the messaging value reaches or exceeds acceptance threshold $t_{acc}$ 538a, HMD 260 can be instructed to answer the telephone call.

If the messaging value decreases to rejection threshold $t_{rej}$ 538b or below, the messaging value can indicate a desire to answer the call of "no" and/or a call state of "reject". Once the messaging value is less than or equal to rejection threshold $t_{rej}$ 538b, HMD 260 can be instructed to reject the telephone call; e.g., route the call to voice mail, terminate the call, play a "not available message."

The messaging value can be represented as a numerical value. In scenario 530, messaging range 536 can use a percentage-oriented scale: $v_{min}$ can equal 0, $t_{rej}$ 538b can equal to 10, vinit can equal to 50, $t_{acc\_can}$ equal to 90, and $v_{max}$ can equal 100. Sub-ranges of messaging range 536 can be associated with call states: as shown in FIG. 5B for scenario 530, the sub-range $v_{min}$ to $t_{rej}$ can be associated with the reject state, the sub-range $t_{rej}$ to $t_{acc}$ can be associated with the ringing state, and the sub-range $t_{acc}$ to $v_{max}$ can be associated with the answer state. In other embodiments and/or scenarios, other parameters/values can be used for $v_{min}$, $v_{init}$, $v_{max}$, $t_{rej}$, and $t_{acc}$, more or fewer thresholds can be used, more, different, or fewer states can be associated with messaging range 536, and/or more or different range(s) can be used.

Scenario 536 continues with HMD 112 displaying card 534b of ZAOD 534 with contact information, including an image of a grey diamond and a name Ace, for the calling party being displayed at an initial size. Card 534b indicates the call state by displaying the phrase "Call Ringing" In some embodiments, sounds such as a ring tone or other tones can be periodically and/or continuous played while ZAOD 534 is displayed.

In some embodiments, the size of contact information displayed on card(s) of ZAOD 534 can depend on the messaging value; e.g., if $v_{init}$ equals 50%, the initial size used to display information using ZAOD 534 can be 50% of the maximum size. Then, as the messaging value changes, the size used by ZAOD 534 to display information can change in proportion.

In some embodiments, a Z coordinate of a card displaying information in ZAOD 534 can be related to the size used by ZAOD 534 to display information and/or the messaging value; i.e., the Z coordinate of the card in ZAOD 534 can be proportional or otherwise related to the size used by ZAOD 534 to display information and/or the messaging value. For example, if the current messaging value $v_{cur}$ equals 40% and Z coordinates range from a $Z_{min}$ value of −10 to a $Z_{max}$ value of +10, then the current Z coordinate $Z_{cur}$ can be determined as:

$$Z_{cur} = Z_{min} + \frac{(v_{cur} - v_{min})}{(v_{max} - v_{min})} * (Z_{max} - Z_{min}) \quad (1)$$

$$=-10+((40\%-0\%)/(100\%-0\%))*(10-(-10))$$

$$=-10+(40\%/100\%*20)=-10+(40\%*20)=-10+8=-2.$$

Additionally, selecting a Z coordinate value with the range of Z coordinate values can be used to determine a messaging value. Continuing the example above, if $Z_{cur}=-2$, the current messaging value $v_{cur}$ can be determined as:

$$v_{cur} = v_{min} + \frac{(z_{cur} - z_{min})}{(z_{max} - z_{min})} * (v_{max} - v_{min}) \quad (2)$$

$$=0\%+((-2-(-10))/(+10-(-10))*(100\%-0\%)$$

$$=0\%+(8/20)*(100\%)=0\%+0.4*100\%=40\%$$

Then, the size used by ZAOD 534 to display information can be determined based on the determined $Z_{cur}$ value and/or the current messaging value $v_{cur}$ using similar equations to equations (1) and (2) above. Other techniques for converting between messaging values, Z coordinate values, and sizes are possible as well.

During scenario 530, wearer 242 first performs a swipe away operation using touchpad 262. In response to the swipe away operation, HMD 260 can decrease the messaging value and decrease the size used by ZAOD 534 to display aspects of information, such as the contact information and/or call state indication displayed using ZAOD 534. In scenarios where the messaging value is less than or equal to rejection threshold $t_{rej}$ 538b, then card 534c can be displayed, with the contact information displayed with a relatively-small size and a call state indication that the call from Ace was rejected.

During scenario 530, wearer 242 decides to answer the call from Ace. As such, wearer 242 performs one or more swipe toward operations until card 534a of ZAOD 534 is displayed, showing the contact information with a relatively-large contact information aspect and a call state indication of "Answered" to show that the call from Ace was answered.

Figure 5C:
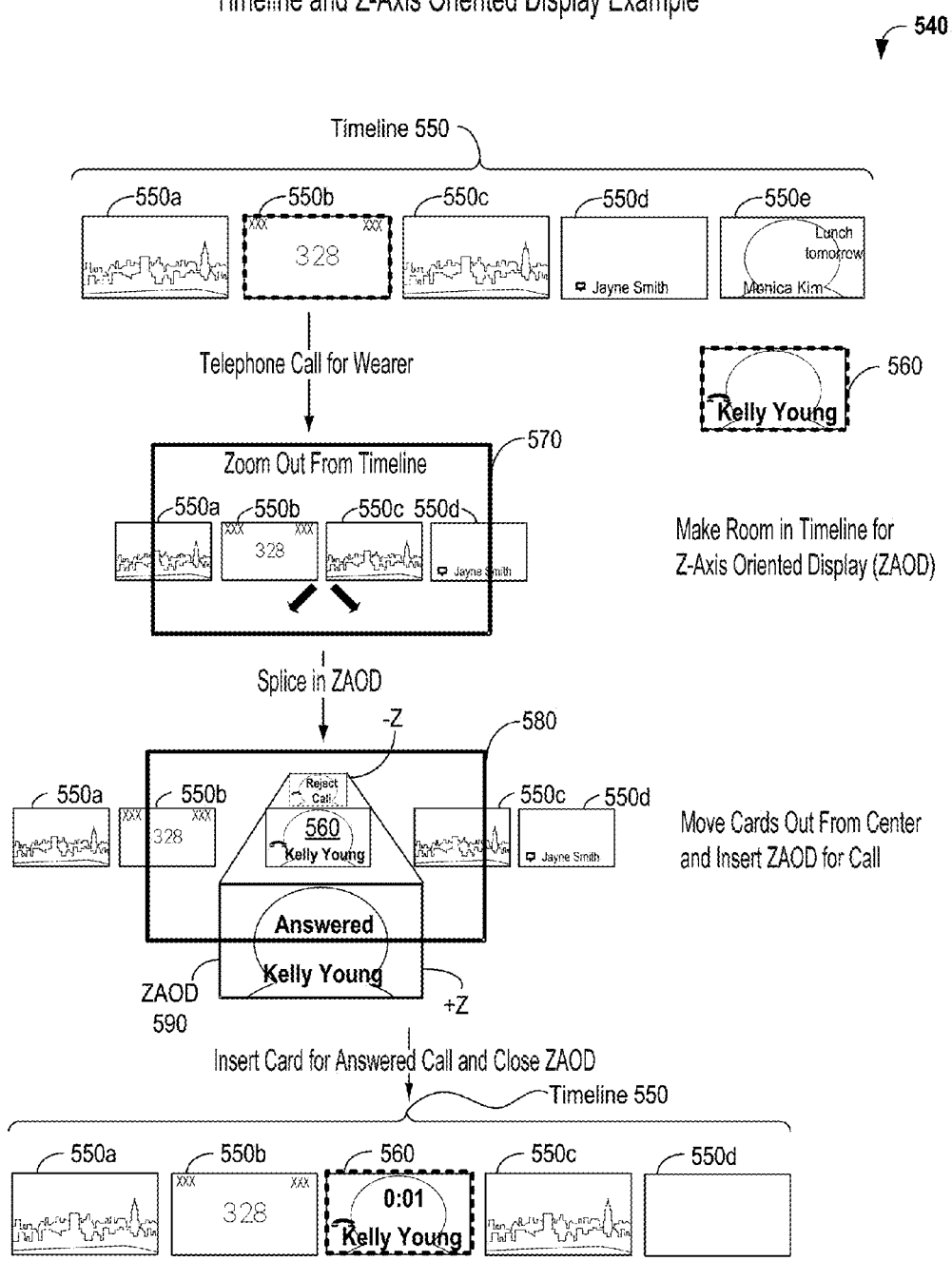
FIG. 5C shows a scenario using both timelines and Z-axis oriented displays, according to an example embodiment.

Timelines and ZAODs can be used together, for example, to allow interaction with a message via a ZAOD while operating with a timeline. FIG. 5C shows a scenario 540 using both timelines and Z-axis oriented displays, according to an example embodiment. Scenario 540 begins with an HMD, such as HMD 260, displaying timeline 550 that includes five cards 550a, 550b, 550c, 550d, and 550e.

Cards other than the home card associated with the time of now can be classified as current cards, and cards associated with a future time can be classified as upcoming cards. For example, card 550c is a current card that includes an image currently generated by a camera associated with HMD 260, card 550d is a current card that includes an icon of a video camera representing a "hangout" HMD application for a video conference call currently in-progress with at least "Jayne Smith" on the call, and card 550e is an upcoming card that includes images and text generated by a calendar HMD application representing an appointment with "Monica Kim" for "Lunch tomorrow".

Scenario 540 continues with HMD 260 receiving an indication of a telephone call for wearer 242—this indication is shown graphically on FIG. 5C as card 560 with an image of a calling party "Kelly Young" and a telephone icon to indicate that the indication relates to a telephone call. In response to the indication, HMD 260 can generate display 570 that involves zooming out from timeline 550 and begin to move cards out from the center of display 570. Display 570 and 580 are each bounded by a respective thick black line to indicate what wearer 242 sees. FIG. 5C shows that display 570 includes parts of cards 550a and 550d and the entireties of cards 550b and 550c.

In scenario 540, the cards are being moved out of from the center of display 570 to "splice in" or make room in timeline 550 to insert ZAOD 590 to represent the incoming call, such as discussed above in the context of FIG. 5B. HMD 260 can then generate display 580 that shows part of timeline 550; e.g., cards 550b and 550c with ZAOD 590 between cards 550b and 550c. HMD 260 can be configured to animate the splicing operation by showing room being made for ZAOD 590 in the timeline and then showing ZAOD 590 placed into the timeline. In some embodiments, all cards of timeline 550 can be removed from display 580 while ZAOD 590 is being displayed. To simulate Z axis operations in XY-oriented display 580, increasing the size of an object in ZAOD 590 can simulate bringing the object closer (in the Z dimension), while decreasing the size of an object in ZAOD 590 can simulate moving away from the object (in the Z dimension).

In scenario 540, the wearer of the HMD would like to answer the call from Kelly Young. To accomplish this, as discussed above in the context of FIG. 5B, wearer 242 can answer the call from Kelly Young by using one or more swipes toward, and reject the same call using one or more swipes away, perhaps by using associated messaging values. Further, in response to swipes toward, ZAOD 590 can increase a size of contact information associated with the call, such as the image and name of the calling party, Kelly Young. FIG. 5C shows that part of ZAOD 590 is outside of display 580; however, this is an artifact of attempting to show ZAOD 590 emerging from display 580. In operation, all images/cards generated by ZAOD 590 can be displayed within the bounds of display 580. In some embodiments, all cards of timeline 550 are removed from display 580 while ZAOD 590 is being displayed. In these embodiments, once ZAOD 590 is no longer being displayed; i.e., once the call is answered, rejected, or otherwise handled, one or more cards of timeline 550 subsequently can be displayed.

Scenario 540 continues with wearer 242 answering the call from Kelly Young using ZAOD 590. Upon determining that the call has been answered, HMD 260 can: close ZAOD 590, insert card 560 into timeline 550 to represent the answered call with Kelly Young, and redisplay timeline 550 as shown in FIG. 3. As the telephone call with Kelly Young is a current and most recent event for HMD 260, a card representing the telephone call; e.g. card 560, would be adjacent to and on the future/now side of a timeline. That is, for timeline 550 shown at the top of FIG. 5B, card 560 would be spliced into, or inserted or placed into the middle of, timeline 550 between home card 550b and card 550c. In some embodiments, the wearer can answer the call by performing a tap operation while ZAOD 590 is being displayed.

Scenario 540 can conclude with HMD 260 answering the telephone call before, during, or after the animation of the splicing operation, and the telephone call between Kelly Young and the wearer entering the talking state.

The splicing operation can be performed in reverse when a card is to be removed from a timeline; that is, a "reverse splice" can be performed. For example, after the call with Kelly Young is completed, card 560 could be removed from the timeline 500. In an embodiment, an animation that is substantially in the reverse of the splicing process described above with respect to timeline 550 except without using ZAOD 590 during the reverse splice.

Figure 6:
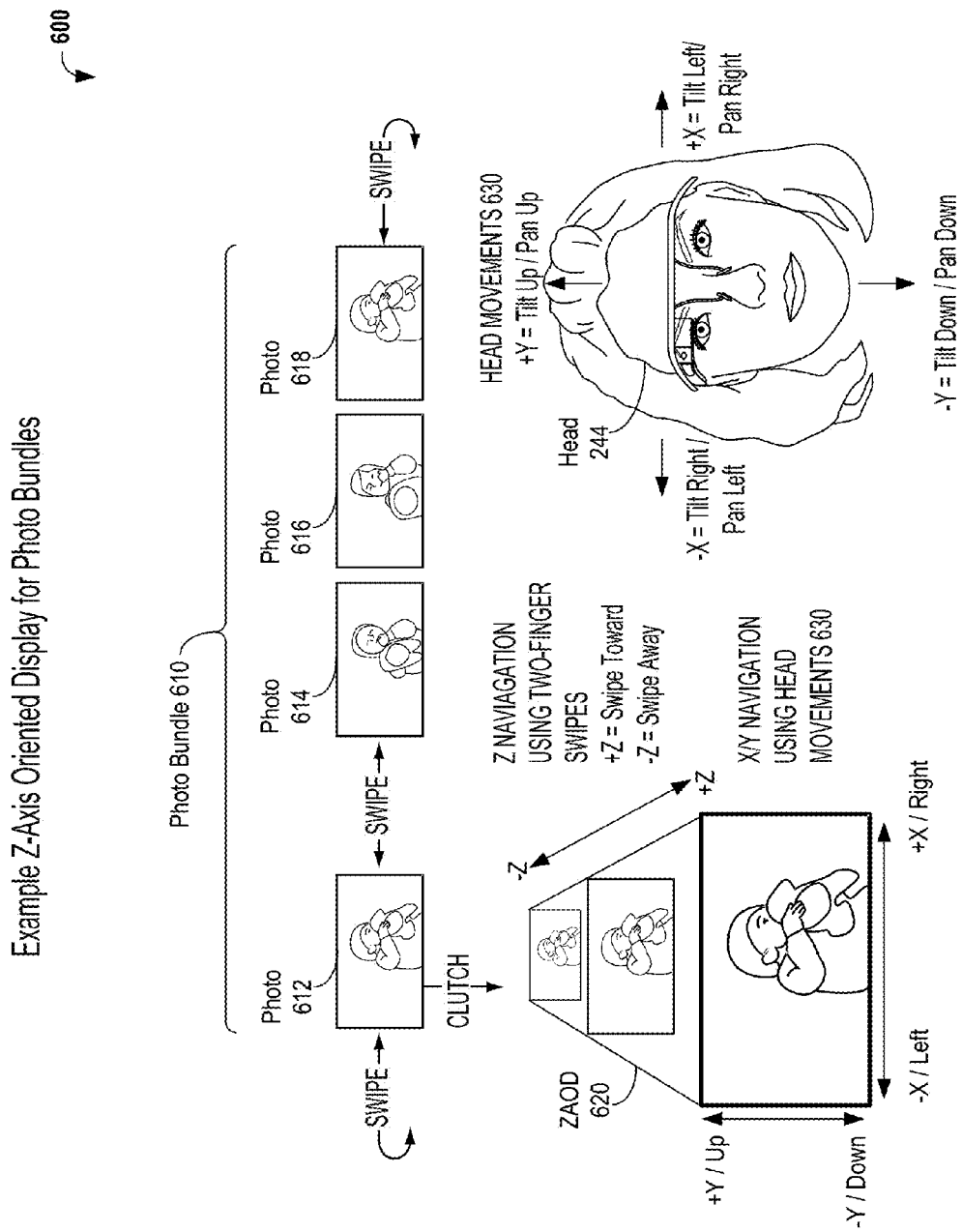
FIG. 6 shows an example scenario for using a Z-axis oriented display with a photo bundle, according to an example embodiment.

Objects, such as photos and messages, can be grouped or "bundled" by the UI to simplify interactions with these bundles. FIG. 6 shows scenario 600 for using Z-axis oriented display 620 with photo bundle 610, according to an example embodiment.

Scenario 600 begins with an HMD, such as HMD 260, displaying photo bundle 610 as a timeline including photos 612, 614, 616, and 618. At the beginning of scenario 600, HMD 260 can display a card with photo 612.

Each individual item within a bundle, e.g., a photo within a photo bundle, functions the same with respect to the user interface as it would if the item were displayed on the timeline. For example, in the case of a photo, such as photo 612, performing a clutch operation on touchpad 262 can instruct HMD 260 to generate a ZAOD for examining photo 612, and swiping down while in the ZAOD can return to displaying photo 612 as part of a timeline; i.e., in an X-Y axes oriented display.

While displaying photo 612, HMD 260 can receive a swipe forward to display the next photo in the bundle or a swipe backward to display the previous photo in the bundle. In scenario 600 as shown in FIG. 6, the next photo to photo 612 can be photo 614. As photo 612 is the first photo in the bundle, the previous photo is the last photo in the bundle, or photo 618.

During scenario 600, wearer 242 performs a clutch operation using touchpad 262 of HMD 260 while HMD 260 displays photo 612. In response to the clutch operation, HMD 260 can display ZAOD 620 to enable examination of photo 612. Two finger swipe operations can be used to navigate along the Z-axis of ZAOD 620. To simulate Z axis operations. increasing the size of an object in ZAOD 620 can simulate bringing the object closer (in the Z dimension), while decreasing the size of an object in ZAOD 620 can simulate moving away from the object (in the Z dimension). That is, while displaying ZAOD 620, two finger swipes toward can increase a Z coordinate for ZAOD 620 and increase the displayed size; e.g., zoom in on photo 612, and two finger swipes away can decrease the Z coordinate and decrease the displayed size; e.g., zoom out from photo 612.

Movements of head 244 of wearer 242 wearing HMD 260, such as head movements 630, can be used to navigate along the X and Y axes of ZAOD 620. For example, head movements 630 regarding Y-axis navigation can include a tilt up of head 244 of wearer 242 to increase the Y coordinate for ZAOD 620 and a tilt down of head 244 of wearer 242 to decrease the Y coordinate for ZAOD 620. Visually, as indicated on the lower-left side of ZAOD 620 in FIG. 6, increasing the Y coordinate appears as "panning" or moving up in the display of photo 612, and decreasing the Y coordinate appears as panning down in the display of photo 612.

Regarding X-axis navigation of ZAOD 620, head movements 630 can include a tilt right of head 244 of wearer 242 (from wearer 242's point of view) to decrease the X coordinate for ZAOD 620 and a tilt left of head 244 of wearer 242 (from wearer 242's point of view) to increase the X coordinate for ZAOD 620. Visually, as indicated on the bottom of ZAOD 620 in FIG. 6, increasing the X coordinate appears as panning right in the display of photo 612, and decreasing the X coordinate appears as panning left in the display of photo 612.

While displaying photo 612, wearer 242 can lift his/her fingers from touchpad 262, thereby ending the clutch operation that caused ZAOD 620 to be displayed. In response to ending the clutch operation, HMD 260 can close ZAOD 620 and display photo bundle card 612 as part of a timeline and scenario 600 can end. In some embodiments, HMD 260 can, in response to ending the clutch operation, maintain display, pan, and zoom settings of image 612 for possible uses, such as sharing, of edited/cropped image 612 after scenario 600 has completed.

Figure 7:
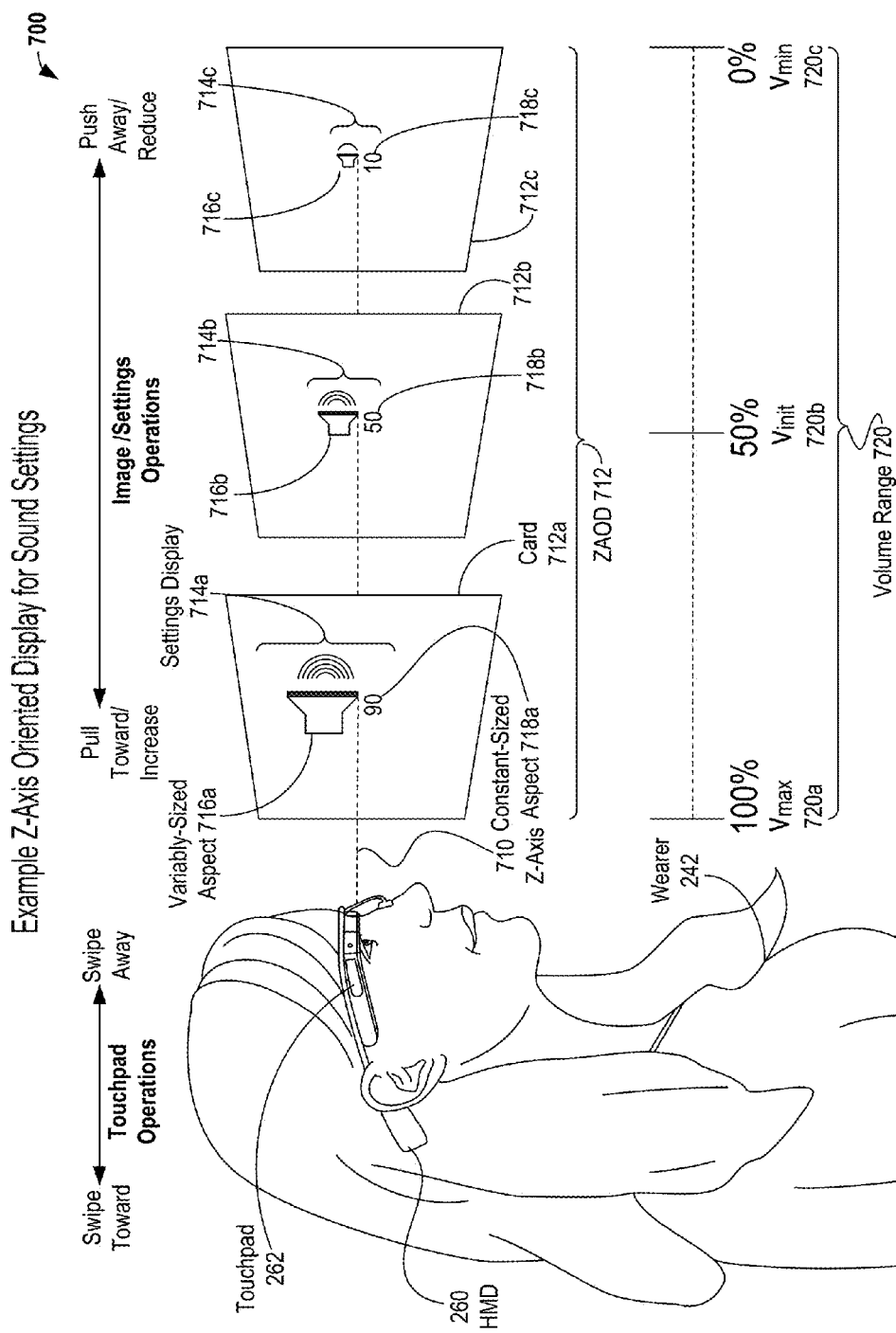
FIG. 7 shows an example scenario for using a Z-axis oriented display for controlling sound settings, according to an example embodiment.

The HMD can have various settings, including but not limited to settings for sounds, displays, and networks (e.g., WiFi and Bluetooth networks). FIG. 7 shows an example scenario 700 for using a Z-axis oriented display for controlling sound settings, according to an example embodiment. Scenario 700 begins with wearer 242 wearing HMD 260 and accessing the settings or setup application to adjust a volume parameter within volume range 720. HMD 260 can then use ZAOD 712 to permit wearer 242 to review and set the current setting of the volume parameter within volume range 720 via graphical operations along Z axis 710. To simulate Z axis operations, increasing the size of an object in ZAOD 712 can simulate bringing the object closer (in the Z dimension), while decreasing the size of an object in ZAOD 712 can simulate moving away from the object (in the Z dimension).

In some embodiments, HMD 260 can play a sample tone or tones at a selected volume while interacting with ZAOD 712 to set the volume; e.g., HMD 260 can play the sample tone(s) if wearer 242 does not change the selected volume within a pre-determined period of time, such as one or a few seconds.

In scenario 700, HMD 260 initializes the volume parameter to an initial value $v_{init}$ 720b, between a minimum value $v_{min}$ 720c and a maximum value $v_{max}$ 720a. FIG. 7 shows $v_{init}$ 720b is 50% of the loudest available or maximum setting $v_{max}$ 720a. In other scenarios, the volume parameter can be initialized to a previously-set value of the volume parameter and/or a different initial value than 50%. Along with selecting an initial volume value, HMD 260 can select an initial Z coordinate and/or initial size for variably sized aspect(s) of card(s) in ZAOD 712, perhaps using Equations (1) and/or (2) discussed above in the context of FIG. 5B and/or similar equations customized for volume settings.

After selecting the initial volume setting for the volume parameter, size(s), and Z coordinate(s), HMD 260 can generate and display card 712b of ZAOD 712 to display the initially selected volume setting. FIG. 7 shows that card 712b includes a settings display 714b with two aspects: a variably sized aspect 716b, shown as an image of a loud speaker, and a constant sized aspect 718b, shown as a numerical value of the initially selected volume setting.

After displaying card 712b, scenario 700 can continue with wearer 242 performing a swipe away operation using touchpad 262. In response to the swipe away operation, HMD 260 can decrease the value of the volume parameter, Z coordinate of ZAOD 712, and/or size(s) of at least variably-sized aspect(s) of ZAOD 712. After selecting a value of the volume parameter, size, and/or a Z coordinate for ZAOD 712, HMD 260 can use Equations (1) and/or (2) discussed above in the context of FIG. 5B (and/or similar equations customized for volume parameters and/or Z coordinates) to determine, as needed, corresponding value(s) of volume parameters, Z coordinate(s), and/or size(s) for variably sized aspect(s) of card(s) in ZAOD 712.

In response to completing the swipe away operation, HMD 260 can generate and display card 712c of ZAOD 712 to display the selected volume setting. FIG. 7 shows card 712c with a settings display 714c having two aspects: a variably sized aspect 716c, shown as an image of a loud speaker, and a constant sized aspect 718c, shown as a numerical value of the selected setting for the volume parameter. Variably-sized aspect 716c is smaller than the variably-sized aspect initially displayed as part of card 712b (e.g., variably-sized aspect 716b) and indicating a value of 90 for the volume parameter using constant sized aspect 718c that is less than the initial volume value of 50.

In some embodiments, HMD 260 can generate and display one or more cards between initially displayed card 718b and later displayed card 718c; e.g., display a card in ZAOD 712 every time the value of the volume parameter decreases (or in other scenarios, increases) by at least a predetermined amount. For example, as the value drops from 50 to 10 during the swipe away operation, a card corresponding to a value of 30 can be generated and displayed in ZAOD 712 about halfway through the swipe away operation.

The amount that size(s) of variably-sized aspects and/or associated values, such as the Z coordinates and/or values of the volume parameter, change from swipe to swipe (or, in some embodiments, as intermediate values during a swipe) can depend on one or more factors. These factors include, but are not limited to, a speed of the wearer's fingers as they move long touchpad 262, a distance that the wearer's fingers travel along touchpad 262, and a number of fingers touching touchpad 262 while making a swipe, e.g., longer swipes, faster swipes, and/or using more fingers during a swipe can lead to greater changes in Z coordinates, sizes and/or values than shorter swipes, slower swipes, and/or using fewer fingers during the swipe. Other factors are possible as well.

After displaying card 712c, scenario 700 can continue with wearer 242 performing one or more swipe forward operations on HMD 260 using touchpad 262. In response to the swipe toward operation(s), HMD 260 can increase the value of the volume parameter, Z coordinate of ZAOD 712, and size(s) of at least variably-sized aspect(s) of ZAOD 712. After selecting a value of the volume parameter, size, and/or a Z coordinate for ZAOD 712, HMD 260 can use Equations (1) and/or (2) discussed above in the context of FIG. 5B (and/or similar equations customized for volume parameters and/or Z coordinates) to determine, as needed, corresponding value(s) of a volume parameter, Z coordinate(s), and/or size(s) for variably sized aspect(s) of card(s) in ZAOD 712.

In response to completing the swipe toward operation, HMD 260 can generate and display card 712a of ZAOD 712 to display the selected setting of the volume parameter. FIG. 7 shows card 712a with a settings display 714a having two aspects: a variably sized aspect 716a, shown as an image of a loud speaker, and a constant sized aspect 718a, shown as a numerical value of the selected setting of the volume parameter. Variably-sized aspect 716a is larger than the variably-sized aspect initially displayed as part of card 712b (e.g., variably-sized aspect 716b) and indicating a value of 10 for the volume parameter using constant sized aspect 718a that is greater than the initial volume value of 50.

In some embodiments, HMD 260 can generate and display one or more cards between initially displayed card 718b and later displayed card 718a; e.g., display a card in ZAOD 712 every time the value of the volume parameter increases (or in other scenarios, decreases) by at least a predetermined amount. For example, as the value of the volume parameter increases from 10 to 90 during the swipe toward operation(s), a card corresponding to a value of 30 for the volume parameter can be generated and displayed in ZAOD 712 about one-quarter of the way through the swipe away operation. The amount that size(s) of variably-sized aspects and/or associated values, such as the Z coordinates and/or values of the volume parameter, change from swipe to swipe (or, in some embodiments, as intermediate values during a swipe) can depend on one or more factors discussed above in the context of card 712c.

After HMD 260 displays card 712a of ZAOD 712, scenario 700 can conclude by wearer 242 deciding to exit the settings or setup application. The current value of 90 for the volume parameter associated with card 712a can then be saved and used during operation of HMD 260, for example, to set output volumes for one or more speakers, such as speaker 125 discussed above in the context of FIG. 1A. Other settings can be selected utilizing ZAODs as well, such as, but not limited to network settings, display settings, accounts settings, location settings, and security settings.

Figure 8:
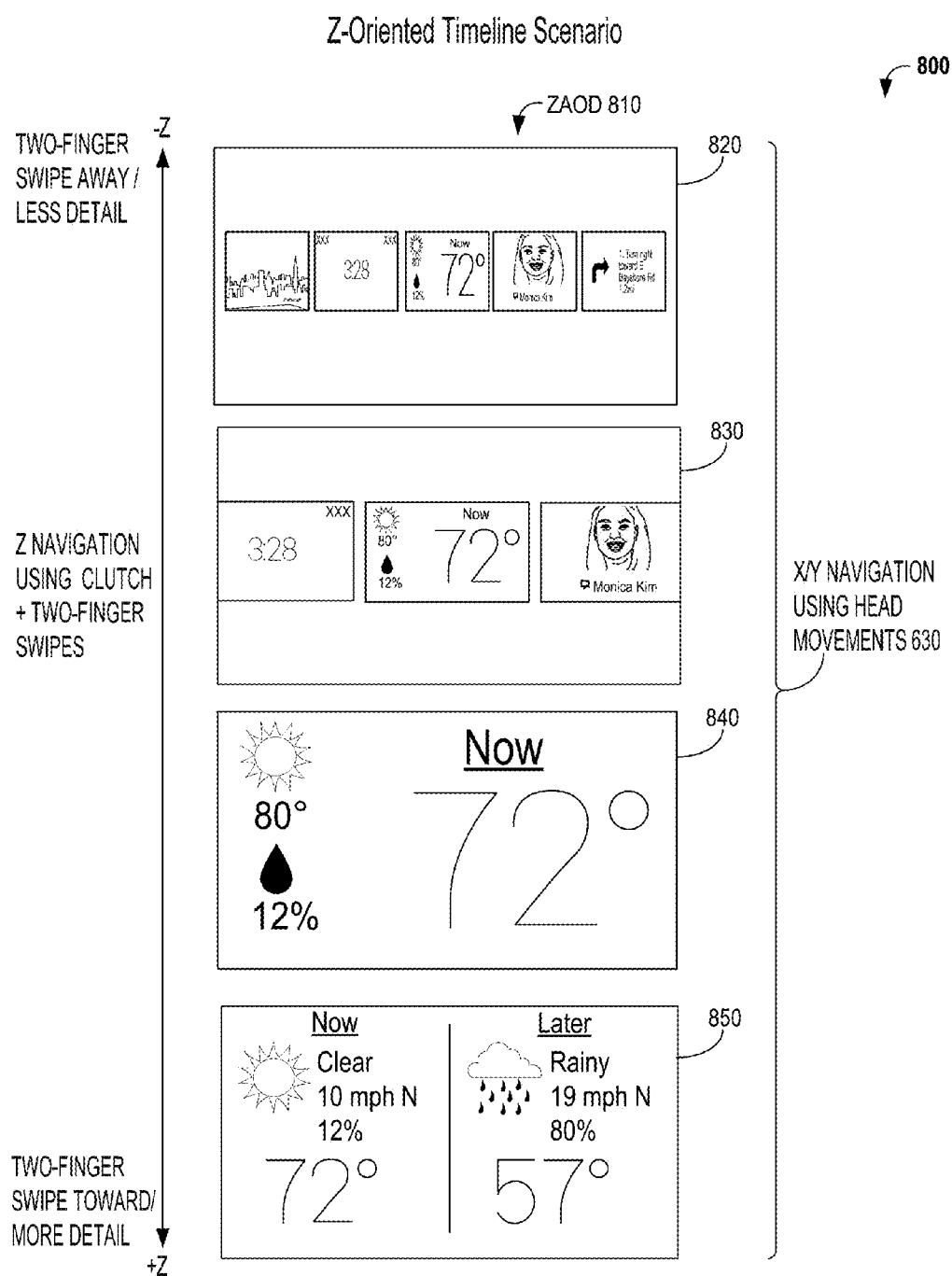
FIG. 8 shows an example scenario for navigating a timeline using a Z-axis oriented display, according to an example embodiment.

FIG. 8 shows scenario 800 for navigating a timeline using a Z-axis oriented display, according to an example embodiment. Scenario 800 begins with a wearer of an HMD, such as wearer 242 of HMD 260, viewing a timeline using an X-Y oriented display, such as a display of timeline 510 shown in FIG. 5A, and focusing on card 840.

Scenario 800 continues with wearer 242 performing a clutch operation, or other similar operation, to place at least two fingers on a touchpad of an HMD, such as touchpad 262 of HMD 260. In response to the clutch operation, HMD 260 can generate and display card 840 in ZAOD 810. To simulate Z axis operations, increasing the size of an object in ZAOD 810 can simulate bringing the object closer (in the Z dimension), while decreasing the size of an object in ZAOD 810 can simulate moving away from the object (in the Z dimension).

While ZAOD 810 is being displayed, Z axis navigation can be performed using two-finger swipes—as shown in FIG. 8, a two-finger swipe away operation corresponds to zooming out; that is, decreasing the Z coordinate of ZAOD 810 and showing less detail in ZAOD 810. A two-finger swipe towards operation corresponds to zooming in using ZAOD 810; that is; increasing the Z coordinate of ZAOD 810 and showing more detail in ZAOD 810. For example, while displaying card 840, a two-finger swipe away can lead to HMD 260 displaying card 830. FIG. 8 shows that card 830 shows less detail as three sub-cards, representing three cards of the timeline are shown as card 830. Then, a two-finger swipe away while displaying card 830 can lead to HMD 260 displaying card 820 and its five sub-cards, with less detail than card 830. In scenario 800, card 820 shows the least amount of detail available via use of ZAOD 810; i.e., additional two-finger swipes away while card 820 is displayed will not lead to additional zooming out.

Scenario 800 continues with wearer 242 performing one or more two-finger swipe toward operations to zoom in on card 820. In response to the two-finger swipe toward operation(s), HMD 260 can display, in succession, cards 820, 830, 840, and 850 with each successive card showing additional detail. For example, card 820 has five sub-cards, card 830 has three sub-cards, card 840 shows one card displaying weather information, and card 850 shows one card with more weather information than shown using card 840.

HMD 260 can use head movements, such as head movements 630, to perform X axis and Y axis navigation while displaying ZAOD 810; e.g., head movements 630 can be used to move up, down, left, and right within a card displayed as part of ZAOD 810, which may lead to changing the display shown as part of the card. For example, if wearer 242 tilts head 244 to the right, which leads to panning left, while card 820 is being displayed, additional sub-card(s), if available, that have X component(s) less than a sub-card on a left-hand side of card 820 can be shown as part of card 820. During the pan left, sub-cards on a right-most side of card 820 can be deleted to make room for the additional sub-cards being added on the left-most side of card 820.

Similarly, if wearer 242 tilts head 244 to the left, which leads to panning right, while card 830 is being displayed, additional sub-card(s), if available, that have X component(s) greater than a sub-card on the right-hand side of card 820 can be shown as part of card 820. During the pan right, sub-cards on a left-most side of card 820 can be deleted to make room for the additional sub-cards being added on the right-most side of card 820. Y axis movements; e.g., movements up and down within the card being displayed by ZAOD 810 can be controlled using respective tilt up and tilt down movements of head 244 of wearer 242.

In scenario 800, HMD 260 can display ZAOD 810 as long as at least two fingers of wearer 242 are touching touchpad 262. In other scenarios, ZAOD 810 can be displayed as the default interface to a timeline, and as such, can be used without wearer 242 keeping two fingers on touchpad 262. Scenario 800 ends after wearer 242 lifts both fingers from touchpad 262, which leads to HMD 260 removing ZAOD 810 from display.

E. EXAMPLE METHODS OF OPERATION

Figure 9:
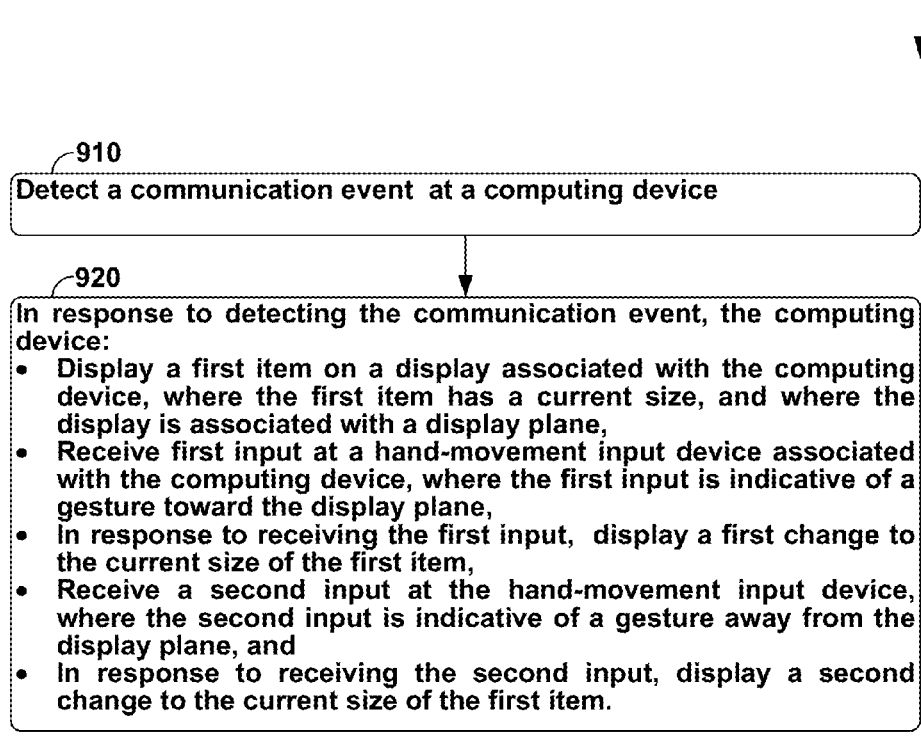
FIG. 9 is a flow chart illustrating a method, according to an example embodiment.

FIG. 9 is a flow chart illustrating method 900, according to an example embodiment. In FIG. 9, method 900 is described by way of example as being carried out by a computing device, such as a wearable computer and possibly a wearable computer embodied as a HMD; e.g., HMD 260. However, it should be understood that example methods, such as method 900, may be carried out by a wearable computer without wearing the computer. For example, such methods may be carried out by simply holding the wearable computer using the wearer's hands. Other possibilities may also exist.

Further, example methods, such as method 900, may be carried out by devices other than a wearable computer, and/or may be carried out by sub-systems in a wearable computer or in other devices. For example, an example method may alternatively be carried out by a device such as a mobile phone, which is programmed to simultaneously display a graphic object in a graphic display and also provide a point-of-view video feed in a physical-world window. Other examples are also possible.

As shown in FIG. 9, method 900 begins at block 910, where a computing device can detect a communication event.

At block 920, in response to detecting the communication event, the computing device can display a first item on a display associated with the computing device, where the first item has a current size, and where the display can be associated with a display plane. The computing device can receive a first input at a hand-movement input device, such as a touchpad, associated with the computing device, where the first input can be indicative of a gesture toward the display plane. In response to receiving the first input, the computing device can display a first change to the current size of the first item. The computing device can receive a second input at the hand-movement input device, where the second input can be indicative of a gesture away from the display plane. In response to receiving the second input, the computing device can display a second change to the current size of the first item.

In some embodiments, displaying the first change to the current size of the first item can include increasing the current size and displaying the second change to the current size of the first item can include decreasing the current size. In other embodiments, displaying the first change to the current size of the first item can include decreasing the current size and displaying the second change to the current size of the first item can include increasing the current size. In some other embodiments, the hand-movement input device can be configured to detect gestures in a plane that is substantially perpendicular to the display plane.

In some embodiments, method 900 can additionally include: in further response to receiving the first input, the computing device can make a first adjustment to a value for a setting of the computing device; and in further response to receiving the second input, the computing device can make a second adjustment to the value for the setting of the computing device. In particular embodiments, the display is configured to display at least a variably-sized aspect and a constant-sized aspect, where the constant-sized aspect can include the value for the setting of the computing device.

In some embodiments, the communication event can include an incoming call, where the first item can include contact information indicative of a calling party of the incoming call. In particular embodiments, the incoming call can be associated with a messaging value. Then, method 900 can further include determining an acceptance threshold ($t_{acc}$) and a rejection threshold ($t_{rej}$) for the messaging value. In some of the particular embodiments, displaying the first change to the current size of the first item can include increasing the current size. Then, method 900 can further include, in response to receiving the first input: increasing the messaging value, determining whether the increased message value is greater that the acceptance threshold, and after determining that the increased message value is greater that the acceptance threshold, accepting the incoming call.

In some other of the particular embodiments, displaying the first change to the current size of the first item can include increasing the current size. Then, method 900 can further include, in response to receiving the second input: decreasing the messaging value, determining whether the decreased message value is less that the rejection threshold, and after determining that the decreased message value is less than the rejection threshold, rejecting the incoming call.

F. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method comprising:
   detecting by a head-mountable device (HMD) a communication event, wherein the communication event comprises an incoming call; and
   in response to detecting the communication event, the HMD:
   displaying a first item on a front-mounted display associated with the HMD, wherein the first item has a current size, wherein the first item comprises contact information indicative of a calling party of the incoming call, wherein the incoming call is associated with a messaging value, and wherein the display is aligned with a display plane;
   determining an acceptance threshold and a rejection threshold for the messaging value;
   receiving a first input at a side-mounted touchpad associated with the HMD, wherein the first input is indicative of a swipe gesture on the side-mounted touchpad;
   determining whether the swipe gesture on the side-mounted touchpad is toward the display plane;
   if the swipe gesture on the side-mounted touchpad is toward the display plane:
      displaying a first change to the current size of the first item, wherein displaying the first change to the current size of the first item comprises increasing the current size;
      increasing the messaging value;
      determining that the increased message value is greater that the acceptance threshold; and
      after determining that the increased message value is greater that the acceptance threshold, accepting the incoming call;
   otherwise, if the swipe gesture on the side-mounted touchpad is away from the display plane:
      displaying a second change to the current size of the first item; and
      declining the communication event.

2. The method of claim 1, wherein displaying the first change to the current size of the first item comprises increasing the current size, and wherein displaying the second change to the current size of the first item comprises decreasing the current size.

3. The method of claim 1, wherein displaying the first change to the current size of the first item comprises decreasing the current size, and wherein displaying the second change to the current size of the first item comprising increasing the current size.

4. The method of claim 1, further comprising:
   if the swipe gesture on the side-mounted touchpad is toward the display plane, making a first adjustment to a value for a setting of the HMD; and
   if the swipe gesture on the side-mounted touchpad is away from the display plane, making a second adjustment to the value for the setting of the HMD.

5. The method of claim 4, wherein the display is configured to display at least a variably-sized aspect and a constant-sized aspect, and wherein the constant-sized aspect comprises the value for the setting of the HMD.

6. The method of claim 1, wherein displaying the second change to the current size of the first item comprises decreasing the current size, and wherein the method further comprises:
   if the swipe gesture on the side-mounted touchpad is away from the display plane:
   decreasing the messaging value;
   determining whether the decreased message value is less than the rejection threshold; and
   after determining that the decreased message value is less than the rejection threshold, rejecting the incoming call.

7. A head-mountable device (HMD) comprising:
   a processor; and
   a non-transitory computer-readable storage medium having stored thereon program instructions that, upon execution by the processor, cause the HMD to perform functions comprising:
   detecting a communication event, wherein the communication event comprises an incoming call; and
   in response to detecting the communication event:
      displaying a first item on a front-mounted display associated with the HMD, wherein the first item has a current size, wherein the first item comprises contact information indicative of a calling party of the incoming call, wherein the incoming call is associated with a messaging value, and wherein the display is aligned with a display plane;
      determining an acceptance threshold and a rejection threshold for the messaging value;
      receiving a first input at a side-mounted touchpad associated with the HMD, wherein the first input is indicative of a swipe gesture on the side-mounted touchpad;
      determining whether the swipe gesture on the side-mounted touchpad is toward the display plane;
      if the swipe gesture on the side-mounted touchpad is toward the display plane:
         displaying a first change to the current size of the first item, wherein displaying the first change to the current size of the first item comprises increasing the current size;
         increasing the messaging value;
         determining whether the increased message value is greater that the acceptance threshold; and
         after determining that the increased message value is greater that the acceptance threshold, accepting the incoming call;
      otherwise, if the swipe gesture on the side-mounted touchpad is away from the display plane:
         displaying a second change to the current size of the first item; and
         declining the communication event.

8. The HMD of claim 7, wherein displaying the first change to the current size of the first item comprises increasing the current size, and wherein displaying the second change to the current size of the first item comprises decreasing the current size.

9. The HMD of claim 7, wherein displaying the first change to the current size of the first item comprises decreasing the current size, and wherein displaying the second change to the current size of the first item comprises increasing the current size.

10. The HMD of claim 7, wherein the side-mounted touchpad is configured to detect swipe gestures in a plane that is substantially perpendicular to the display plane.

11. The HMD of claim 7, wherein the functions further include:
   if the swipe gesture on the side-mounted touchpad is toward the display plane, making a first adjustment to a value for a setting of the HMD; and if the swipe gesture on the side-mounted touchpad is away from the display plane, making a second adjustment to the value for the setting of the HMD.

12. The HMD of claim 11, wherein the display is configured to display at least a variably-sized aspect and a constant-sized aspect, and wherein the constant-sized aspect comprises the value for the setting of the computing device HMD.

13. The HMD of claim 7, wherein displaying the second change to the current size of the first item comprises decreasing the current size, and wherein the functions further comprise:
   if the swipe gesture on the side-mounted touchpad is away from the display plane:
   decreasing the messaging value,
   determining whether the decreased message value is less than the rejection threshold, and
   after determining that the decreased message value is less than the rejection threshold, rejecting the incoming call.

14. An apparatus, including a non-transitory computer-readable storage medium having stored thereon program instructions that, upon execution by a head-mountable device (HMD), cause the apparatus to perform functions comprising:
   detecting a communication event, wherein the communication event comprises an incoming call; and
   in response to detecting the communication event:
      displaying a first item on a front-mounted display associated with the apparatus, wherein the first item has a current size, wherein the first item comprises contact information indicative of a calling party of the incoming call, wherein the incoming call is associated with a messaging value, and wherein the display is aligned with a display plane;
      determining an acceptance threshold and a rejection threshold for the messaging value;
      receiving a first input at a side-mounted touchpad associated with the HMD, wherein the first input is indicative of a swipe gesture on the side-mounted touchpad;
      determining whether the swipe gesture on the side-mounted touchpad is toward the display plane;
      if the swipe gesture on the side-mounted touchpad is toward the display plane:
      displaying a first change to the current size of the first item, wherein displaying the first change to the current size of the first item comprises increasing the current size;
      increasing the messaging value;
      determining whether the increased message value is greater that the acceptance threshold; and
      after determining that the increased message value is greater that the acceptance threshold, accepting the incoming call;
      otherwise, if the swipe gesture on the side-mounted touchpad is away from the display plane:
      displaying a second change to the current size of the first item; and
      declining the communication event.

15. The apparatus of claim 14, wherein displaying the first change to the current size of the first item comprises increasing the current size, and wherein displaying the second change to the current size of the first item comprises decreasing the current size.

16. The apparatus of claim 14, wherein displaying the first change to the current size of the first item comprises decreasing the current size, and wherein displaying the second change to the current size of the first item comprises increasing the current size.

17. The apparatus of claim 14, wherein displaying the second change to the current size of the first item comprises decreasing the current size, and wherein the functions further comprise:
   if the swipe gesture on the side-mounted touchpad is away from the display plane:
   decreasing the messaging value,
   determining that the decreased message value is less than the rejection threshold, and
   after determining that the decreased message value is less than the rejection threshold, rejecting the incoming call.

* * * * *